United States Patent [19] [11] 4,009,912
Mraz [45] Mar. 1, 1977

[54] PNEUMATIC CONVEYING APPARATUS AND METHOD
[76] Inventor: Joseph Mraz, 501 E. Lee St., Plant City, Fla. 33566
[22] Filed: Feb. 3, 1976
[21] Appl. No.: 654,796

Related U.S. Application Data

[63] Continuation-in-part of Ser. No. 520,943, Nov. 4, 1974, abandoned, which is a continuation-in-part of Ser. No. 327,640, Jan. 29, 1973, abandoned, and Ser. No. 193,630, Oct. 29, 1971, abandoned.

[52] U.S. Cl. .................................. 302/25; 302/40; 302/52; 302/57; 302/58
[51] Int. Cl.² ........................................ B65G 53/14
[58] Field of Search ................ 302/25, 35, 40, 42, 302/39, 58, 50–55, 57

[56] References Cited

UNITED STATES PATENTS

| 1,566,325 | 12/1925 | Hansen | 302/40 |
| 1,567,383 | 12/1925 | Power | 302/23 |
| 1,675,090 | 6/1928 | Burns et al. | 302/50 |
| 2,272,564 | 2/1942 | Kuever, Jr. | 302/47 |
| 2,637,599 | 5/1953 | Fitzpatrick | 302/40 |
| 2,916,441 | 12/1959 | Kruse, Jr. | 302/59 |
| 2,982,082 | 5/1961 | Pool | 302/25 |
| 3,186,769 | 6/1965 | Howlett, Jr. | 302/25 |
| 3,372,958 | 3/1968 | Black | 302/53 |
| 3,460,869 | 8/1969 | Herr | 302/50 |

FOREIGN PATENTS OR APPLICATIONS

| 2,252,870 | 5/1973 | Germany | 302/40 |
| 689,680 | 4/1953 | United Kingdom | 302/25 |

Primary Examiner—Evon C. Blunk
Assistant Examiner—Jeffrey V. Nase
Attorney, Agent, or Firm—Burns, Doane, Swecker & Mathis

[57] ABSTRACT

A pneumatic conveying system for a pulverant, powdery, or liquid product utilizes a high velocity stream of air to create, during normal operation, a zone of negative pressure within a transition chamber into which the product is fed from an inclined chute. The negative pressure condition in the transition chamber tends to suck the product into the air stream. A check valve door on the chute is opened by reason of the negative pressure to allow product feed and is automatically closed to prevent further product feed and blowback resulting from back pressure when the system is blocked. The product may be fed alternately from a pair of tanks of sufficiently small size so that switching from tank to tank occurs less than two minutes apart. The switching is controlled by introduction of low pressure air into one tank at a time which simultaneously closes the product inlet opening into the tank and opens the outlet opening.

14 Claims, 14 Drawing Figures

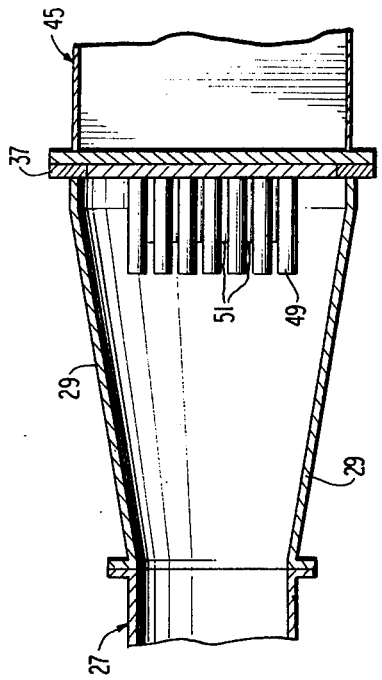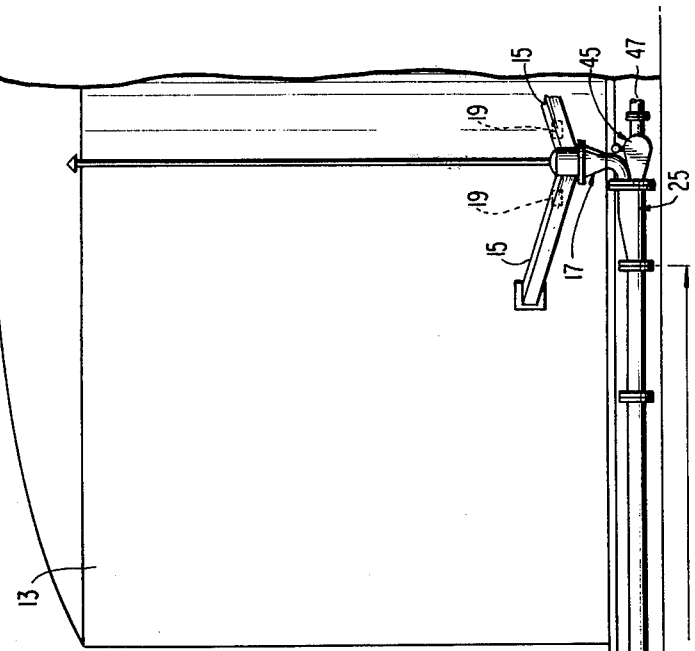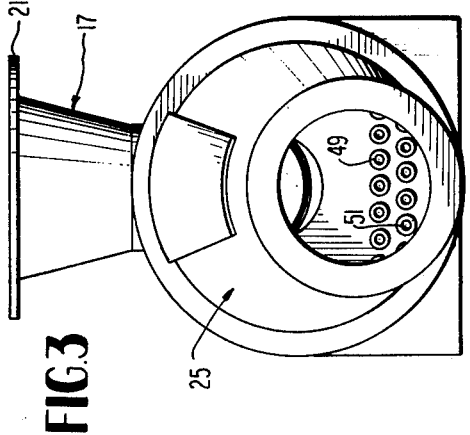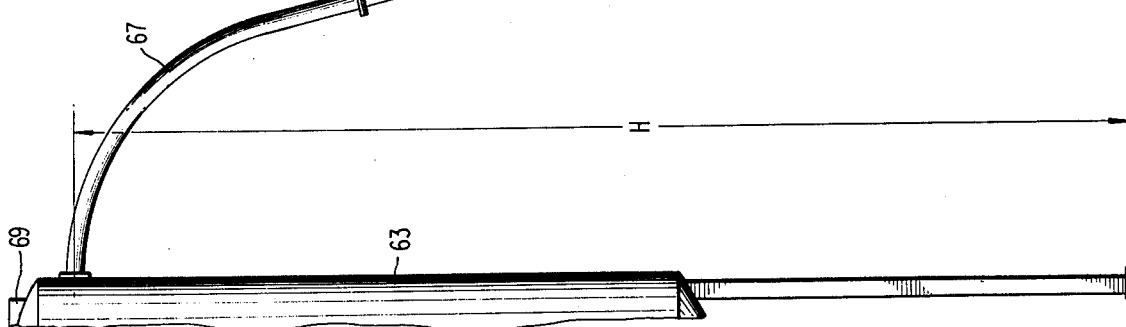

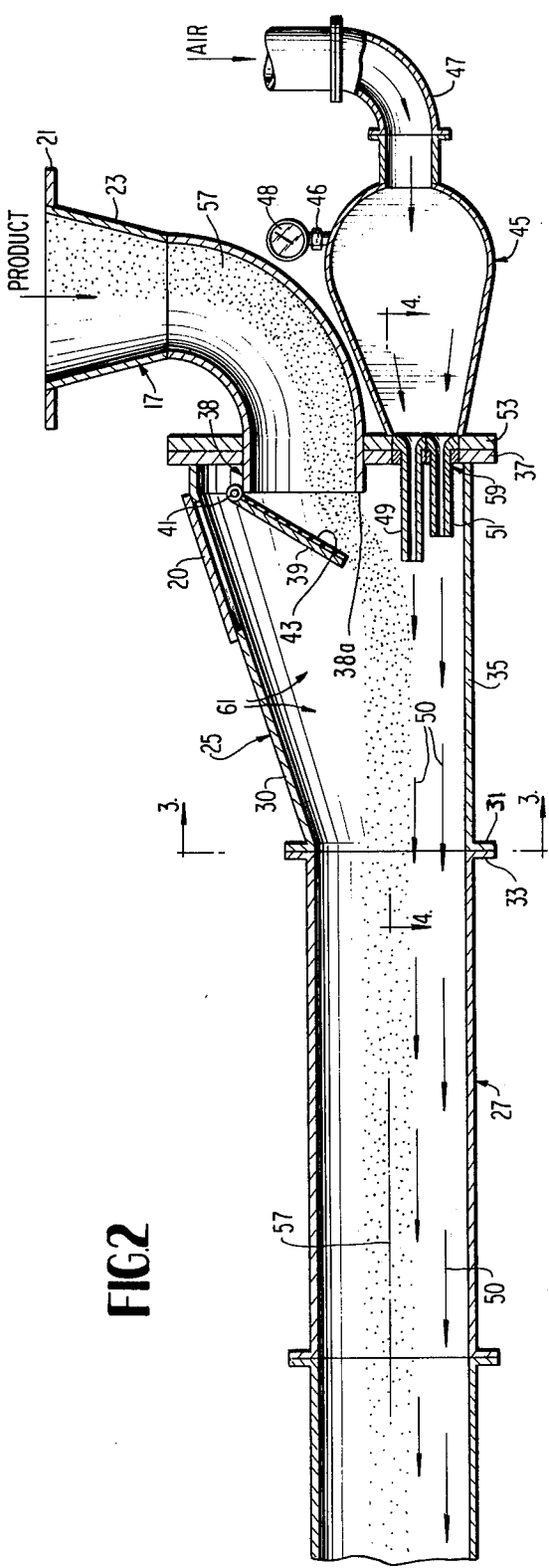
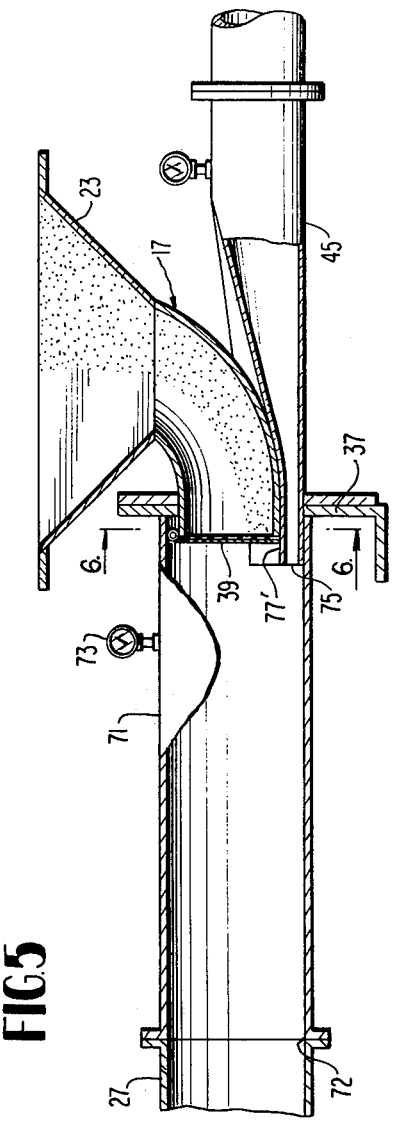
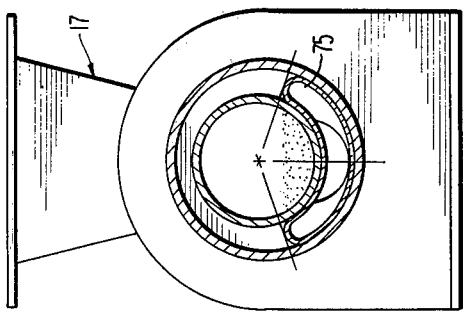

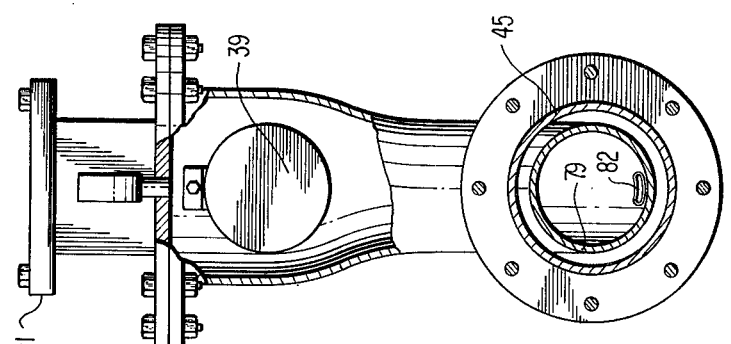
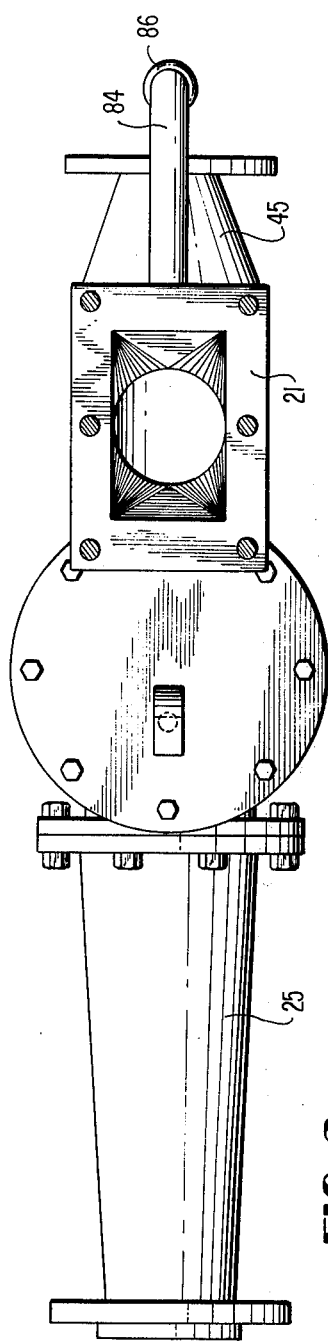
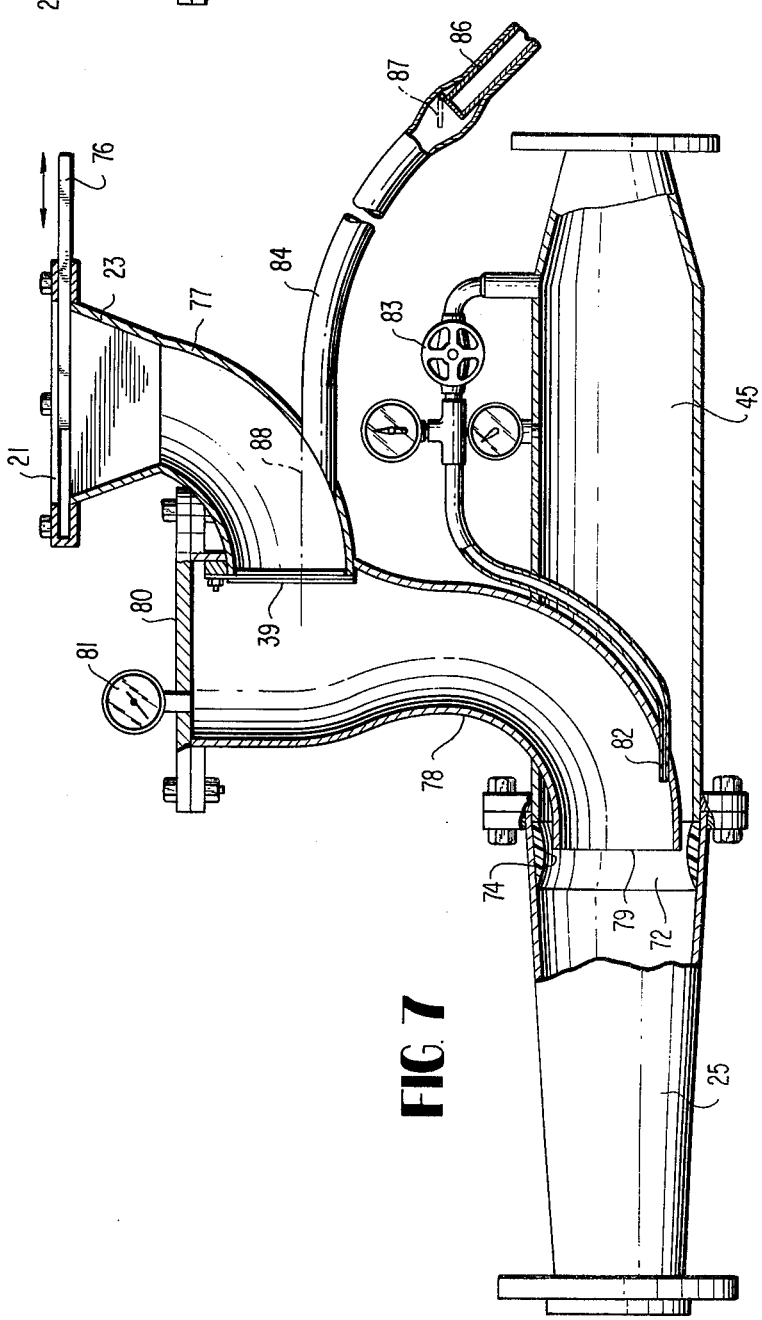

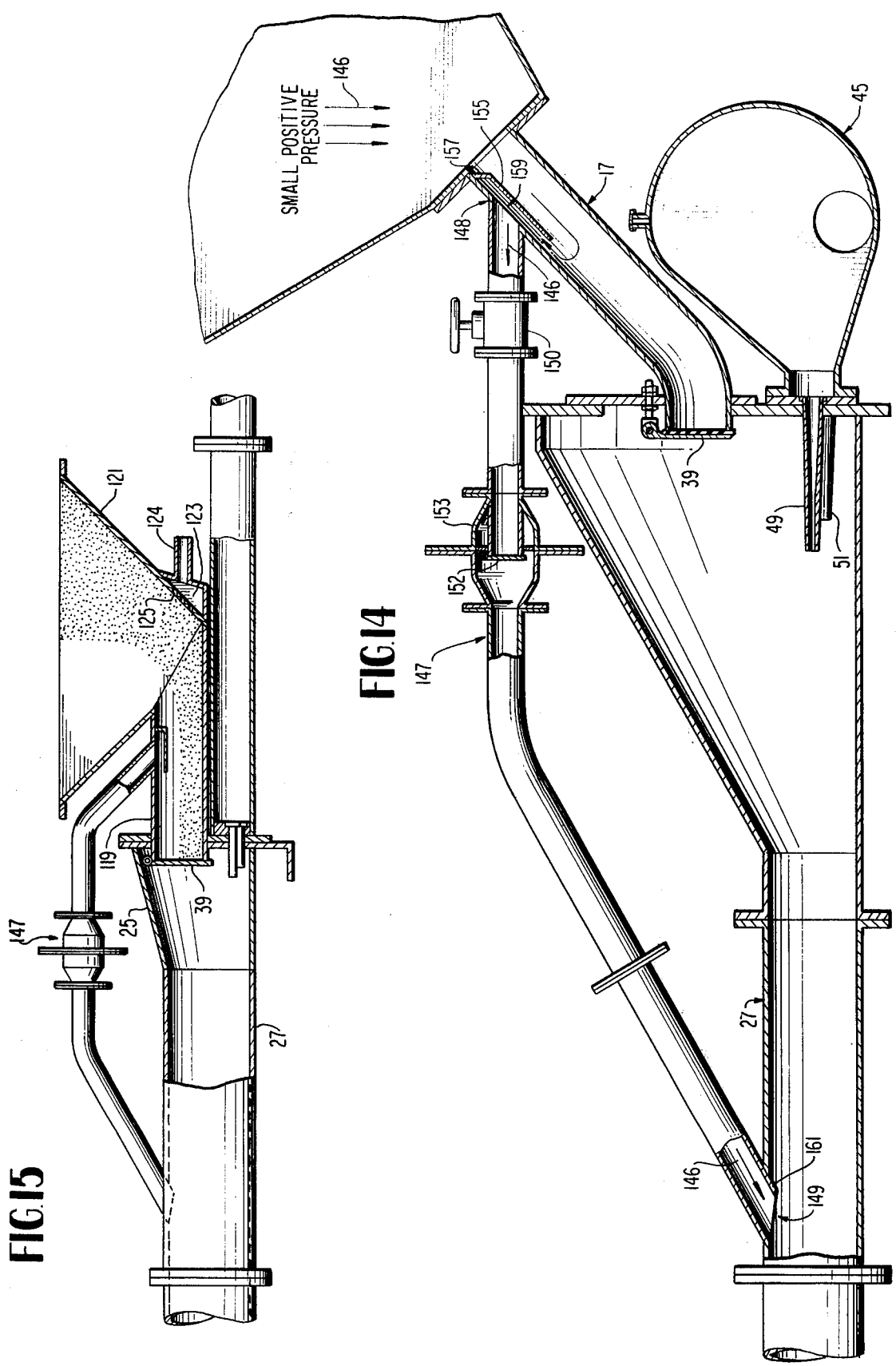

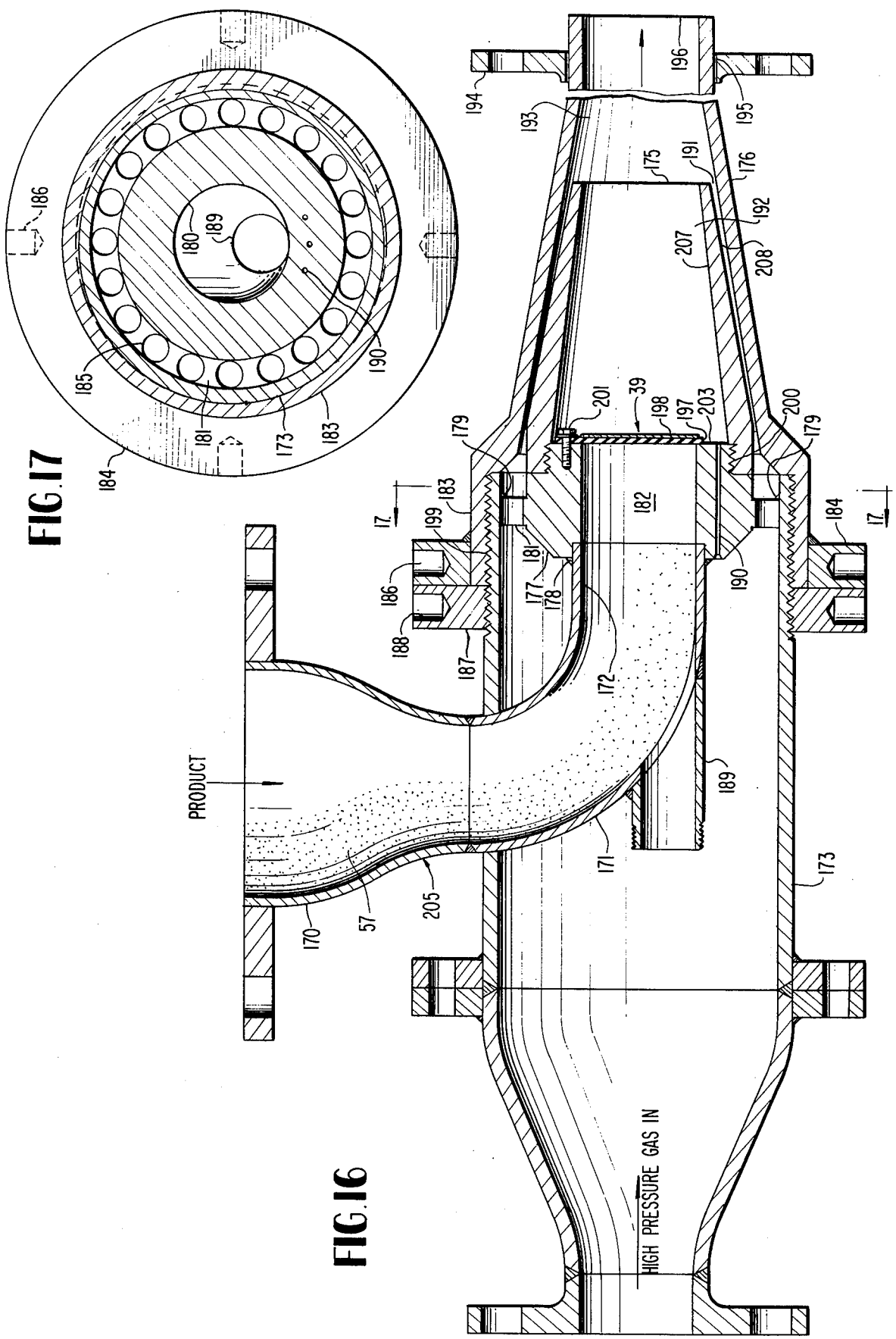

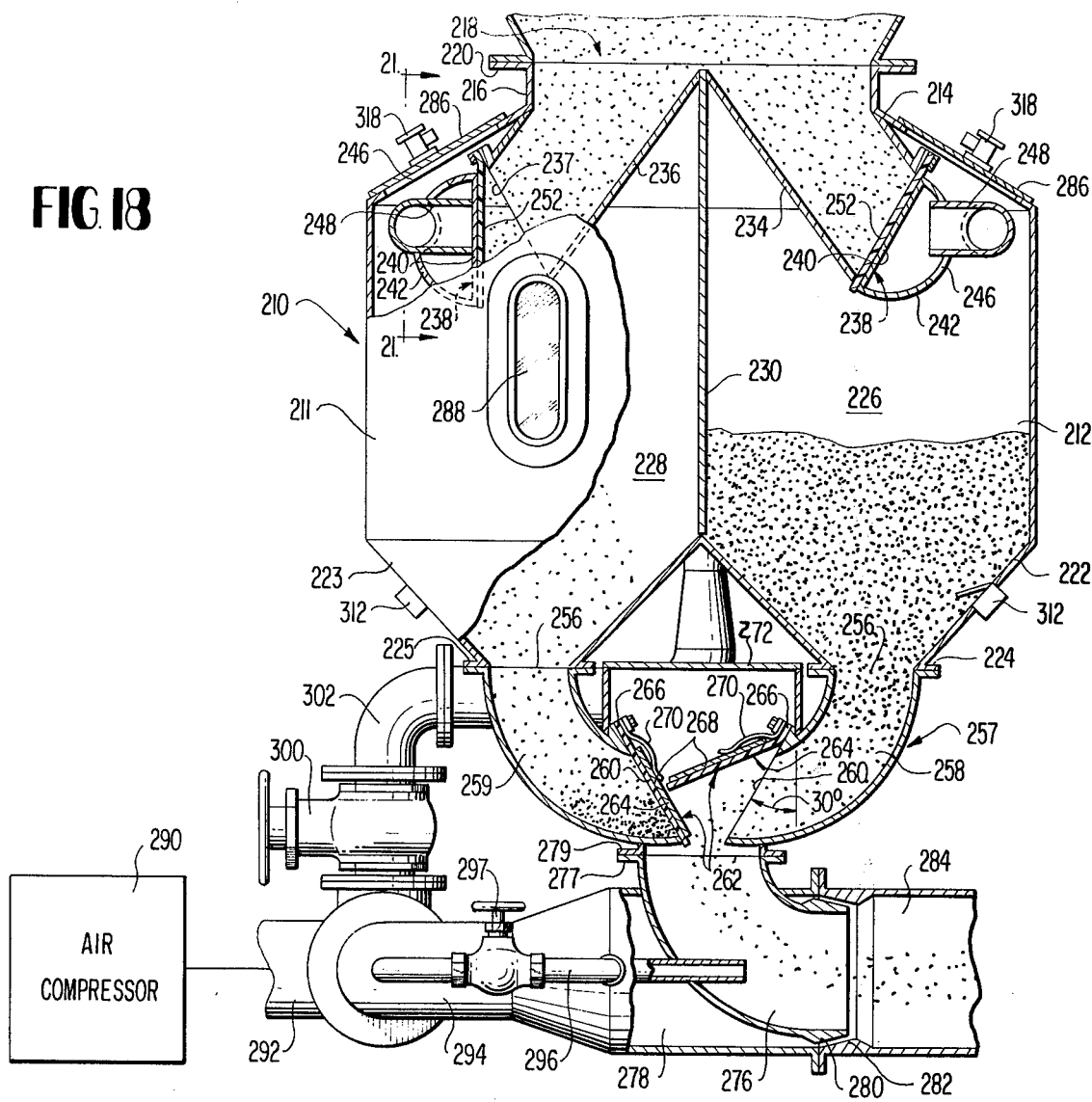
FIG. 18
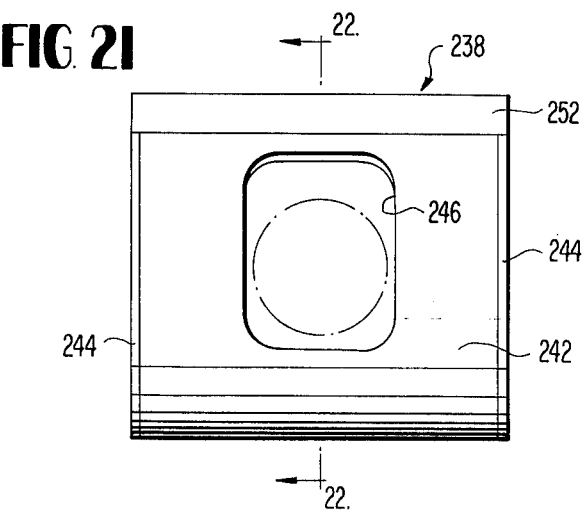
FIG. 21
FIG. 22

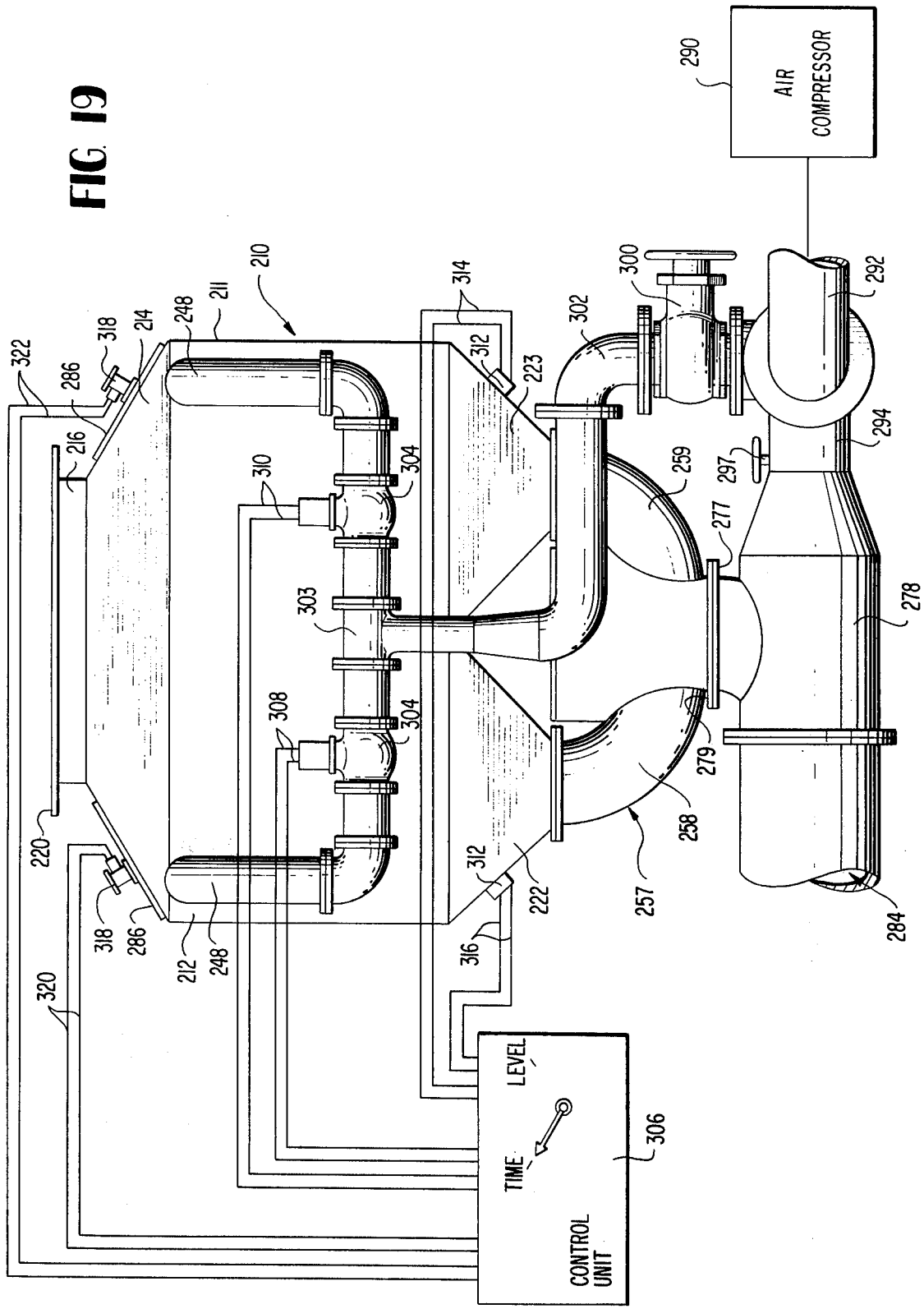

PNEUMATIC CONVEYING APPARATUS AND METHOD

RELATED APPLICATIONS

This application is a continuation-in-part of my copending U.S. application Ser. No. 520,943 filed Nov. 4, 1974 and later abandoned for "Pneumatic Conveying Apparatus and Method", which, in turn, is a continuation-in-part of my U.S. applications Ser. No. 327,640 filed Jan. 29, 1973 and Ser. No. 193,630 filed Oct. 29, 1971, both abandoned.

The present invention relates to a pneumatic conveying apparatus and method for transporting pulverant, powdery, granular or liquid material, hereinafter referred to as product, along a pipeline, and more particularly to apparatus for feeding a product into a pipeline.

It is often necessary to transport a product over relatively long distances and to heights of fifty yards or so in the storing and handling of such materials. Manufacture of the product may take place on a 24 hour schedule and require that the product be continually moved from production areas to storage areas and subsequently to loading zones for ultimate delivery. The product is frequently stored in large tanks or hoppers at locations separated from one another by distances on the order of a hundred yards or more. It is common practice to discharge the product from the lower portions of these tanks to be transported to other tanks which are filled from above.

Pneumatic conveying systems utilizing screw feed conveyor sections have found widespread use in such product handling operations. U.S. Pat. Nos. 1,553,539, 1,941,572, 1,941,573, and 2,299,470 are examples of prior art screw conveyors currently in use in conjunction with feeding a product into a pipeline.

It has been recognized that one of the most troublesome problems encountered while transporting a product pneumatically is the prevention of blowbacks which occurs when there is a blockage in the main pipeline. The prior systems solved this problem by forming a sealing plug of product in the screw conveyor section thereby preventing the unwanted back flow of air into the hopper. In some cases, a weighted door was added to further aid in compacting the product in the screw conveyor section.

These prior systems required substantial maintenance due primarily to the employment of rotating screw feed devices. The abrasive and corrosive nature of many products, such as are used in fertilizers, adversely affected the life of these rotating parts. Additionally, large motors of from 100 to 200 horsepower were required to drive these rotating screw devices. Also, it can be appreciated that the noise associated with the operation of screw conveyors was undesirable.

The problems caused by the blowback of the product and alternate proposals for dealing with this problem are discussed also in patents such as U.S. Pat. Nos. 3,460,869 and 1,675,090. In one such device, an air lock or chamber is provided to isolate the hopper from occasional blowbacks which disrupt product feed. Another device, disclosed in U.S. Pat. No. 1,675,090, utilized a baffle plate to assist in compacting material being delivered from a hopper. It is evident that stopping material flow, should a blockage or overloading occur within the main pipeline, may only be accomplished by the stopping of the rotation of the screw. Where the product to be conveyed has the property of hardening when allowed to set in a compacted condition, removal of the screw is frequently necessary before the system can again be started up.

Additionally, it has been found desirable when transporting highly abrasive or reactive products to cause the product to float in or on a stream of air having very little turbulence associated with it. The low turbulence reduces contact between the product being conveyed and the pipeline walls, and further provides for the complete utilization of any high velocity airstream employed for conveying purposes. Where turbulence is encountered or the product is conveyed through a nozzle, for example, as in British patent No. 1,020,543, the system does not have the desired flow characteristics, and feeds the product while it is in contact with the surfaces of a conveying section, thereby causing the product to be positioned below the conveying nozzle.

A major object of the present invention is to provide a novel pneumatic conveying method and apparatus for efficiently conveying a product along a main pipeline which utilizes a minimum number of moving parts and does not require a screw, rotary gate valve or similar device, thereby substantially reducing maintenance problems and providing for a quieter conveying operation.

A further object is to provide a novel pneumatic conveying method and apparatus for feeding a product into the pipeline through chute having a check valve wherein a pressure increase in a main pipeline, or in a transition chamber where the product is delivered to be conveyed in the pipeline, is utilized directly for cutting off the flow of product to the pipeline through closure of the valve. The system and its method of operation is such that it causes an instant cutoff of the product flow once a blockage of the pipeline occurs, thus preventing a blowback through the chute; and when the normal negative pressure condition occurs in the chamber, the product flow is automatically re-established. One of the features found in certain preferred embodiments resides in the provision of an auxiliary gas stream located in the exit portion of the chute downstream of the valve to "fine tune" the system and enhance movement of the product from the chute into the pipeline.

Another object is to provide in a pneumatic conveying system a novel pressure responsive device for preventing a positive pressure condition in the pipeline from causing a blowback into the product supply hopper, and at the same time providing a vacuum operated inlet pipe which can be used as a suction device for lifting particles and pumping liquids.

Yet another object of the invention is to provide a novel pneumatic conveying method wherein gas is injected under positive pressure along the surface of the delivery chute which is in contact with the pulverant product to assist movement of the product along the surface of the lower chute wall on the upstream side of the valve. In certain embodiments, it has been found desirable to provide also a bypass line which extends from the delivery chute to the pipeline to provide a discharge path for a positive pressure applied to the product flowing from the supply hopper, and a further positive pressure responsive device or check valve within the bypass line for preventing a positive pressure condition in the pipeline from causing a blowback into the product supply hopper.

One aspect of my invention is characterized by having a transition chamber disposed between the pipeline and a source of gas pressure and connected to the gas pressure source so as to provide a region of negative pressure. A product conveying chute is connected between a supply of product and the negative pressure region of the transition chamber. A valve, located in the chute means, is adapted to be opened and closed by a pressure differential, e.g. so arranged as to be opened by the negative pressure in the transition chamber and to be closed by gravity, or a spring force or a combination of both, and to be forced in a closed position by a positive pressure in the transition chamber which occurs when the flow of gas through the transition chamber is blocked or otherwise impeded in such fashion as to cause loss of the negative pressure.

For optimum operation, the rate of product flow is controlled normally to be less than that which occupies the entire cross section of the chute and to be at a substantially uniform rate. However, when the chute is completely filled with the product or when liquids are involved, the rate of product flow will be limited to that which the system can handle.

A further feature of my invention pertains to a new way of controlling the feed of the product into pipeline through the use of dual tanks. I have observed that when movement of the product through the pipeline is intermittent due to overloading of the pipeline which results in temporary blockages, or ceases due to loss of air pressure because of a power outage or malfunction of the compressor, the product continues to be fed into the transition chamber. Before the system can be started up, it is customarily necessary to clean out the transition chamber manually. By use of the dual tank feature of my invention, these problems are obviated. It is accordingly another object to provide a novel system and method for supplying product into the pneumatic pipeline by alternating the product feed first from one tank and then the other tank. The size of the tanks is limited so that each tank can be emptied during a period of less than about two minutes, and preferably about five seconds. At the time of switch-over from one tank to the other, a charge of air is introduced through the feed chute along with or subject to the last of the product flow, to thereby assure that the pipeline is not continuously overloaded.

Another object of my invention is to provide a novel switching from one tank to the other. The tank structure that I preferably employ has an inlet conduit that is sloped and the discharge end arranged so that product feed into the tank can be closed by a novel check valve. This check valve has a rear surface covered by a hood that is selectively supplied with air at a comparatively low pressure less than the compressor pressure. This low pressure provides the sole force to close the check valve. The hood is slotted so that the entire tank is pressurized to thus serve as the operating force for opening the tank discharge door, which also is the check valve that prevents blowback into the tank and regulates somewhat, the rate of product feed in accordance with the negative pressure in the transition chamber. By switching the low pressure from an empty tank to the filled tank, the inlet valve to the empty tank is allowed to be opened by the weight of product on the valve while the valve in the other tank is forced to its closed position solely by the pressure of the low pressure air applied to the chamber under the hood. As the pressure in the other tank builds up, the tank discharge door opens to empty the product into the transition chamber at a rate controlled by the associated check valve at the lower end of the tank.

A further object is to provide a novel Y-shaped housing mounted at the bottom of the two tanks and provided with separate check valves in each inlet leg that are mounted at their upper edges for pivotal movement about substantially parallel horizontal axes with their lower edges moving into a common region so that when one valve is open, its lower edge swings into a position that abuts or at least interferes with the simultaneous opening of the other check valve.

These and other advantages will become more fully apparent from the claims, and from the description as it proceeds in conjunction with the appended drawings wherein:

FIG. 1 is a side elevation of a pneumatic conveying system wherein the present invention is used to convey a granular product from the bottom of one storage tank into the top of a large storage building;

FIG. 2 is a side elevation in section of a portion of the pneumatic conveying apparatus of FIG. 1, showing details of one embodiment of the chute and transition chamber;

FIG. 3 is an end view taken along lines 3—3 of FIG. 2;

FIG. 4 is a top view in section taken along lines 4—4 of FIG. 2;

FIG. 5 is a side elevation view in section showing an alternative construction which may be used for a portion of the pneumatic conveying apparatus;

FIG. 6 is an end view in section taken along lines 6—6 of FIG. 5;

FIG. 7 is a side elevation in partial section showing an embodiment of the present invention wherein the air under pressure is admitted by an annular nozzle, the hopper is adapted to be sealed, and a hose can be employed to introduce a liquid product into the pneumatic conveying system;

FIG. 8 is a top plan view of FIG. 7;

FIG. 9 is an end view of FIG. 8;

FIG. 14 is a side elevation of a pneumatic conveying apparatus and a novel bypass line in accord with a further feature of the invention for removing positive pressure associated with a product input system employing a conventional air slide;

FIG. 15 is a side elevation of a further construction which may be employed in accord with the present invention and employing a fluidizing pad in a horizontal product fee chute and a bypass line;

FIG. 16 is a side elevation in section of still a further construction in which the length of the transition chamber is adjustable;

FIG. 17 is an end section, taken on line 17—17 in FIG. 16, showing the circular orifices through which air is introduced into the transition chamber;

FIG. 18 is a front elevation in partial section of an embodiment of my invention having a dual tank feeding apparatus;

FIG. 19 is a rear elevation of the apparatus of FIG. 18;

Figure 10:
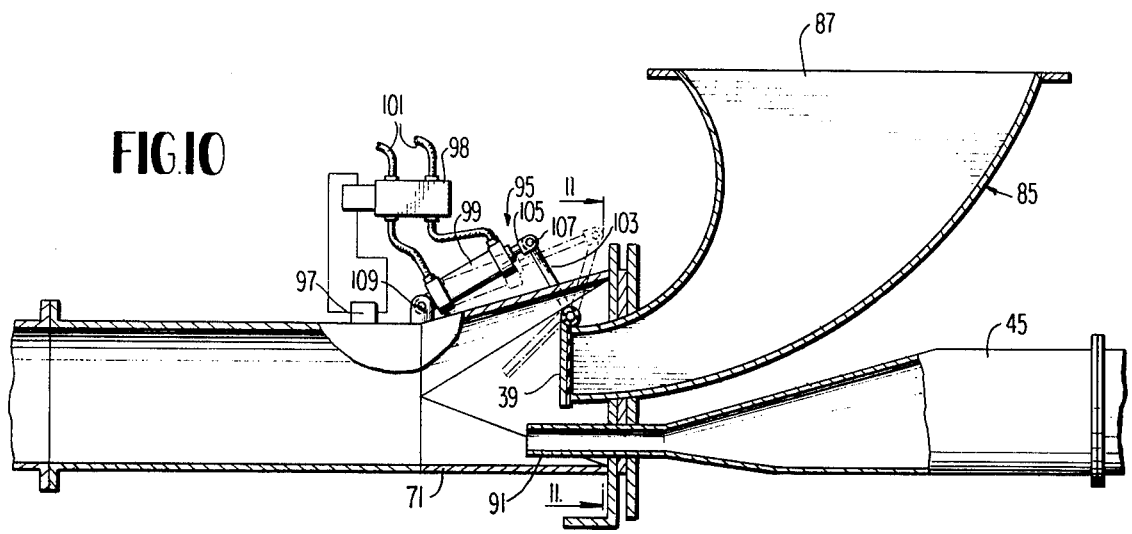
FIG. 10 is a side elevation in section showing a further construction embodying certain features of the present invention.

FIG. 21 is a plan view of the rear of the door closing the inlet channel at the top of tank 211 as viewed along line 21—21 in FIG. 18; and FIG. 22 is an end view of the door taken along line 22—22 of FIG. 21.

Referring to FIGS. 1-4, there is shown one form of the pneumatic conveyor apparatus 11 according to the present invention.

The apparatus includes a bin 13 which serves to store and deliver the product for subsequent conveying. Bin 13 may be in the form of a large tank situated near a railroad siding or some other freight delivery area, or it may be at the end of a chemical processing system and kept constantly supplied with pulverant material. This pulverant material may be in the form of a powder such as cement, dust, or granular particles, such for example as grain, sand, or ground phosphate rock, or the product may be a liquid such for example as water with or without nonliquid substances. In the case of phosphate rock, the product is corrosive and highly abrasive, and has a tendency to clump. The present invention is adapted to efficiently transport this product to a 63 warehouse 53 on a substantially continuous 24-hour/day, seven days a week, basis.

At the lower end of the tank 13, a pair of feed channels 15 are provided. These channels slope downwardly from the bin 13 so as to allow the product to fall by gravity into the chute or chute section 17. Various other conventional flow inducing methods may also be utilized, such as vibration, air slides, mechanical conveying, etc. to deliver material to the chute 17.

The channels 15 conventionally include means for regulating the rate of product flowing from the tank. Feed gate 19 may be provided for this purpose and to control the rate of product flow into a chute 17 by partially restricting the flow of material therethrough, which is preferably inclined, allowing gravity to aid in product transfer (see FIGS. 2-4), and make unnecessary the use of a screw-feed, as has been customarily used in equipment for which the present invention is a replacement. A flange 21 may be provided on the upper periphery of the chute which forms a suitable joint with the channels 15. However, the product may be fed directly into the chute 17 by means of an interconnecting conduit which need not be fastened to the flange 21 but may merely extend freely within a hopper portion 23. The conduit also may have a diameter smaller than that of the upper end of the chute, thus permitting the flow of air, at atmospheric pressure, to enter the hopper portion 23. The hopper portion 23 is shown to have a funnel shape having a larger diameter at an end adjacent the flange 21 while tapering inwardly therefrom. The chute 17, including portion 23, may take on various shapes of a design suitable to effect the even and efficient transfer of product from the supply of product at 13 to the remainder of the conveying apparatus.

The product flows downwardly through the chute 17 by gravity and due to the suction into a transition chamber 25 where the product is pneumatically conveyed along a main pipeline 27. The transition chamber 25 illustrated in FIGS. 2-4 has a larger cross-sectional area than that of the pipeline 27. This chamber includes two side walls 29 and an upper wall 30 which taper inwardly to the pipeline 27. At the joining of the transition chamber 25 with the pipeline 27, interfitting flanges 31 and 33 are provided, respectively, and are suitably fastened together, such as by bolting. A fourth lower wall 35 is in substantial alignment with the lower periphery of the pipeline 27 and connects smoothly thereto. This alignment of the lower surfaces of the chamber 25 and the pipeline 27 is advantageous, as will be more fully described below, for preventing turbulence during the conveying operation.

The top walls 30 may include a clean-out means or door 20 easily removed for any repair or cleaning that the transition chamber may require. The door 20 may be removably secured to the chamber by suitable fasteners such as screws.

The rear wall plate 37 of the chamber 25 contains an upper opening into which the lower discharge end 38 of the chute section 17 extends. The chute end 38 has a material flow passage therethrough and is provided with a door 39 mounted by means of hinge 41 to chute end 38. Door 39, which serves as a check valve member having a face area greater than the cross sectional area of the material flow passage through the discharge end of the chute section 17. It forms an air-tight seal with chute section end wall 38a and when closed prevents a positive pressure buildup in chamber 25 from passing up chute 17 and causing a blowback. Door 39 may be constructed of stainless steel and include a sealing gasket 43 of a suitable material, such as polytetrafluoroethylene or rubber. The door 39 is balanced and mounted for substantially frictionless movement; it normally hangs freely on hinge 41 in a generally vertical plane and in that position closes chute 17.

A source of high pressure gas, normally compressed air or steam, is provided containing a pressure of at least 20, and preferably 25 to 40, pounds per square inch. A safety valve 46 and a pressure gauge 48 are shown on the chamber walls. A source of compressed air (not shown), such as from a conventional compressor, may supply the air to the chamber 45 through a conduit 47. The compressed air source must be able to deliver the appropriate volume of air under pressure to the pressure chamber 45. For an eight inch pipeline, a volume of 750 cubic feet per minute at a pressure of 35 psig is satisfactory.

The common wall between the pressure chamber 45 and the transition chamber 25 must have a configuration which is effective to inject a high velocity stream of gas into the direction of the main pipeline 27 along a predetermined distance L. This gas flow stream creates in the transition chamber 25 a region of pressure lower than atmospheric.

In the embodiment illustrated in FIGS. 2-4, a plurality of nozzles 49 and 51 are employed and are arranged in substantially parallel rows, as is conventional. The nozzles 49 are installed to have their axes substantially parallel to the transition chamber bottom surface 35 to thus direct a high velocity stream of air in a direction parallel to and slightly below the axis of the pipeline 27. The nozzles and the shape of the chamber 25 are designed so as to avoid the creation of air turbulence. The product is delivered from above the high velocity stream and falls onto the stream under the influence of gravity and the air currents which are present in the transition chamber 25.

The larger nozzles 49 are, for example, approximately 11 inches long and have an inner bore of 0.375 to 0.5 inch at the end in chamber 25. The shorter nozzles 51 may have the same inner bore and have a length of approximately 7 inches. The shape and size of these nozzles and the number of nozzles used are dependent on the diameter of the pipeline and the density of the product. The above dimensions are suitable for a four inch main pipeline 27 and a granulated chemical product with air volume flow rates on the order of 200 to 400 cfm.

Product 57 is shown, in FIG. 2, as being introduced along the back edge of the chute 17 and normally filling less than about 50% of the available area in the chute. The product is subjected to the suction resulting from the low pressure region 61 in transition chamber 25 and moves along chute 17 at the end 38 of the chute into the air stream 50 around the nozzles 49. The product is entrained in the stream of air created by the high velocity jet of air from the pressure source 45 being injected into the transition chamber 25.

The high velocity air injected through nozzles 49 and 51, by being directed along the axis of pipeline 27, tends to maintain a flow with very little, if any, turbulence. This high velocity air stream also tends to produce a low pressure area around the wall 37 where the nozzles protrude therethrough, indicated at 59. Most importantly, a negative pressure zone is created in the transition chamber 25 at 61 which serves to open the door 39. The pressure within the chute 17 and extending to the hopper is usually positive, or at least, atmospheric. Thus, a suction is produced along chute 17 which not only aids in providing a smooth product flow into the transition chamber 25, but also opens the door 39 to a small angle of 10° to 20° during the normal conveying operation to allow for the free flow of product therethrough.

Providing a chute 17 which has a cross-sectional area significantly larger than the cross-sectional area of the stream of product is helpful since the total closing force on the door 39 is a function of the product of the door area and the pressure differential on opposite sides of the door. Any positive pressure within the chamber 25, which occurs as a result of turbulence or of a blockage in the pipeline 27, will cause the door 39 to slam shut as rapidly as the pressure rises. Closing of the door instantly blocks the flow of product from the chute 17 to thus give the system an opportunity to clean out and a non-turbulent flow reestablished before further product is fed from chute 17. Also, blowback is totally prevented. The opening of the door 39 is primarily influenced by the pressure at 61 in the transition section and is not controlled, as in some prior art, by the force of the product acting against the door.

It has been observed that when the rate of product feed is slightly excessive, the door 39 closes for very short time intervals of less than a second. On some occasions, the door closings occur several times a minute, thus tending to prevent overloading of the pneumatic system. It is believed that uneven delivery of product to the air stream in chamber 25 will also affect the pressure within zone 61, causing the door 39 to flap rapidly. Thus, the pressure within zone 61 may vary slightly, about a value that, on the average, is slightly less than atmospheric pressure in some installations. Even these slight pressure changes are enough to cause the door 39 to react due to its designed sensitivity.

The sections of pipeline 27 adjacent the transition section or chamber 25 should advantageously extend generally horizontally for a distance sufficient to allow the product deposited on or in the air stream to accelerate to the velocity of the air stream. This is desirable so as to have sufficient force on the product to enable it to rise for the required vertical height for delivery to a receiving means 63. This delivery height H may be, for example, 30 feet or more. It has been found that a pipeline length L between chamber 25 and the first curve at 65 should be a minimum of about 10 feet, for smaller diameter pipes on the order of three inches. For larger pipes of six-inch diameter, or greater, a minimum length L of 18 to 24 feet has been found to be desirable. Transition chamber 25 may have a length of about two to three feet.

To further assist product conveying to this height, the pipeline at 65 and at 67 is gently curved. It has been found that sharp corners introduce undesirable turbulence which is accompanied by wear due to abrasion. By using a bend having a radius of about eight feet or more, wear due to abrasion and erosion on the corner sections of pipe has been found to be significantly reduced.

The receiving structure 63 may be a warehouse or tank, as shown in FIG. 1, having an exhaust means or fan 69 on the roof. This fan is necessary in closed structures to properly exhaust the tank 63 to prevent pressure building up due to the air and product being conveyed therein. Where the receiving structure 63 is a large warehouse with open doors or vents, exhaust fans are not necessary.

As an example of a specific embodiment where pipeline 27 has a diameter of approximately three inches and the system is designed to convey a product having a density of about 80–100 pounds per cubic foot at a rate of about 15 cubic feet per minute, it has been found that four upper nozzles 49 and three lower nozzles 51, each having a bore of about ⅜ inch, were quite satisfactory. The nozzles 49 and 51 had a length of about seven inches and four inches, respectively. The supply pressure in pressure chamber 45 was 35 psi.

FIGS. 5 and 6 illustrate alternative apparatus which may be substituted for the corresponding portion of the conveying apparatus described in connection with FIGS. 1–4. The chute or chute section 17 may comprise a standard of 90° elbow of five-inch pipe having a circular cross-section and a hopper section 23. The lower end of chute 17 extends through a rear plate 37 which is secured to the end of the transition chamber 71 which, in this embodiment, may be six-inch pipe.

The transition chamber 71, in this embodiment, is shown to have substantially the same cross-sectional area as that of the main pipeline 27, which is somewhat larger than the cross-sectional area of chute section 17. The chamber 71 is fitted with a gauge 73 which indicates the pressure adjacent the door 39 which has a face area greater than the cross sectional area of the interior of the chute section 17 through which the material to be fed moves. This gauge, as previously noted, will normally indicate a negative pressure during the normal operation of conveying the product, and will indicate a positive pressure in the event of turbulent gas flow from pipe 45 or in the event of a blockage in the pipeline 27. This door 39, which serves as a check valve on chute 17, will be opened by the negative pressure to allow the product to flow by suction and gravity into the high velocity gas stream. Door 39 will be closed by a positive pressure in the transition chamber 71.

In lieu of individual nozzles, a slot-shaped opening 75, best shown in FIG. 6, provides a high velocity gas flow into transition chamber 71 from a source of high gas pressure in pipe 45. Slot 75 extends around the lower half of the cylindrical wall of chute 17, which is illustrated to extend upwardly from the bottom center and along both sides of the chute by an angle of at least 45° to assure that the product falling from the end of chute 17 will be entrained in the high velocity stream which enters the chamber 71 in the direction of the axis of the pipeline 27. The restricted area of slot 75 comprises a single, arcuately shaped nozzle which converges to its opening into the transition chamber 71. The upper surface 77 around slot 75 protrudes below and beyond the door 39 hinged at the end of the chute 17 so that the door is out of the high velocity air stream issuing from the slot 75. As with the configuration shown in FIGS. 1–4, the air stream is directed along the lower half of the pipeline 27 and is provided with a smooth transfer from the chamber 71 to minimize turbulence in the transition chamber 71.

Referring now to FIGS. 7 through 9, an embodiment is illustrated wherein the hopper 23 for feeding the product is provided with a sliding gate member 76 at flange 21 which can be used to control the rate of product which falls into the hopper, or alternatively to seal the top of the hopper 23. The chute means in this embodiment comprises an upper chute section 77 having an upper end opening into the hopper 23 and a lower outlet or discharge end which terminates at an end wall adapted to be contacted by the swinging door 39 which serves as a check valve. The chute means also includes a lower chute section 78 which has an outlet end 79 that is concentrically disposed within the end of transition chamber 25 that faces chamber 45 which contains the gas under high pressure. The upper end of the lower chute section 78 contains door 39 and may be closed by a cleanout door 80 which may conveniently carry a vacuum gauge 81.

The outside diameter of the outlet end of door lower chute section 78 may be made sufficiently large to provide a very small clearance between the inner surface of the wall of chamber 45 as it opens into transition chamber 25 to thereby provide an annular stream of high velocity air. The high velocity air thus provides a negative pressure at end 79 of the lower chute section which is also present at door 39. Since the upper chute section 77 contains atmospheric pressure, door 39 will open during normal operation of the system where there is substantially no turbulence in transition section 25.

For applications where the product has a tendency to stick or clump, it has been found desirable to provide an additional air pathway to an opening or nozzle 82 which is connected through a valve 83 to the high pressure air chamber 45. By adjustment of valve 83, an auxiliary booster stream of high velocity air can be provided along the lower wall surface of the exit portion of the chute at end 79 where the product is introduced into the high velocity air stream. The added impetus provided by the stream from nozzle 82 can improve the efficiency of operation of the system and serves as a means for optimizing the vacuum registered by gauge 81. By reason of its location in the chute downstream of valve door 39, the stream from nozzle 82 does not otherwise interfere with the operation of the system.

The apparatus as illustrated in FIG. 7 through 9 may also be provided with a flexible conduit or hose 84 which is connected to the lower end of the upper chute section 77 so that when gate 76 is closed, the vacuum which is transmitted through the open door 39 continues down hose 84 to nozzle 86. Upstream of nozzle 86 is a check valve 87 which is opened by the fluid passing through nozzle 86 through hose 84 into the region of low pressure at door 39 to thereby be conveyed in the pneumatic system.

In operation, nozzle 86 may be placed in a reservoir of water or other liquid which is at a level lower than the bottom of the upper chute section 77. As the liquid passes through the lower chute section and into the transition section 25, it is carried away by the high velocity air stream.

In the event the liquid is drawn into transition chamber 25 faster than it can be carried away, turbulence occurs and the negative pressure normally existing in chamber 25 increases above atmospheric pressure to rapidly close door 39. Since the level of liquid in upper chute section 77 cannot rise above line 88, only a slight positive pressure is required to maintain door 39 closed. Any liquid in hose 84 as it starts to exit through nozzle 86 will be held in hose 84 by closure of check valve 87. The system will remain in this condition until such time as the liquid in transition chamber 25 is removed to an extent sufficient to provide non-turbulent air flow which thus generates the negative pressure which will allow door 39 to again open. At that time, additional liquid product can enter the lower section 78 of the chute.

When it is desired to convey granular material through hopper 23, gate 76 can be opened and a cap (not shown) placed over nozzle 86.

For installations where difficulty is encountered in getting satisfactory operation, it has been found desirable to employ means for controlling the area of the slot that extends around the outer surface of the lower chute section outlet end portion 79 and the inside surfaces of the surrounding wall of either the high pressure chamber 45 or the transition chamber 25. As shown in FIG. 7, a liner 72 of metal or plastic may be machined to fit snugly along the inside wall surface of transition chamber 25. The outer wall surface of chute outlet end portion 79 may be beveled along an angle of about 10° and the facing edge surface 74 of liner 72 arranged to continue the inner wall surface of pressure chamber 45 substantially parallel to the beveled surface to direct the high velocity gas stream so as to converge along the axis of the pipeline. By testing several liners 72 of varying dimensions, a particular installation can be pneumatically tuned to give optimum operation which is usually manifested by an increase in the negative pressure registered by gauge 81.

Figure 11:
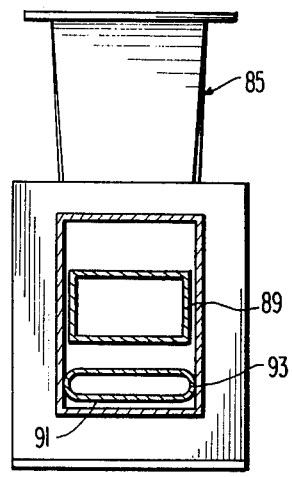
FIG. 11 is an end view in section taken along lines 11—11 of FIG. 10.

In FIGS. 10–11, an additional embodiment is shown wherein a chute 85 is funnel-shaped and tapers in a divergent direction as it extends into the transition chamber 25. The chute 85 may have a rectangular cross-section, as illustrated in FIG. 11, including a rectangular cross-section at end 89 which extends into transition chamber 25.

The restricted area through which the air from the high pressure source 45 enters transition chamber 25 may be in the shape of a rectangular slot 91 which has rounded corners 93. The slot 91 should have a width greater than that of the chute opening at 89 and is positioned therebelow to assure that the product falls on the top of the high velocity air stream. The upper wall defining slot 91 extends beyond the door 39 which serves as the valve member mounted at the end of chute 85. The conveying operation of this embodiment is similar to that of the previously described embodiments, with the air stream being directed along and slightly below the central axis of the pipeline 27.

In this embodiment, door 39 is illustrated as being mechanically actuated rather than being opened by a differential air pressure, as in the other embodiments. Means responsive to transition chamber positive pressure for cutting off material flow from the chute 85 is shown at 95 and may include a pressure sensor 97 of conventional design which senses a positive pressure buildup within the chamber 25 and generates an electrical signal to control a valve 98 used to actuate the piston. A linkage arm 103, which is rigidly connected to door 39 by a hinge shaft which extends through the walls of transition chamber 25 and is pivotally attached to a piston rod 105 for swinging the door 39 about its axis at 107. The hydraulic cylinder or actuator 99 is also pivotally mounted about an axis.

During the normal conveying operation, a low pressure region is created at the pressure sensor 97 and within the chamber at 75. This sensed condition will generate a signal appropriate to keep the door open (as shown in dotted lines) by the suitable positioning of the rod 105. A predetermined positive pressure condition, caused generally by a blocked pipeline, will cause the sensor to send a signal which will actuate the piston in cylinder 99 and quickly close the door 39 (FIG. 10). Various known pressure sensors and actuators can be utilized for the above purpose. The response must, however, be rapid enough to quickly cut off product flow from chute 85. Once the blockage is cleared and the low pressure condition in the chamber 25 detected, the piston in cylinder 99 will cause the door 39 to again open.

Figure 13:
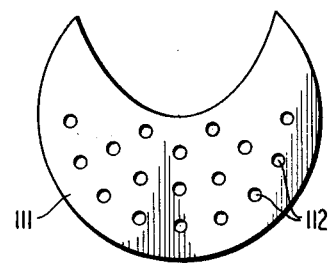
FIG. 13 is an end elevation of the orifice plate of FIG. 12.
Figure 12:
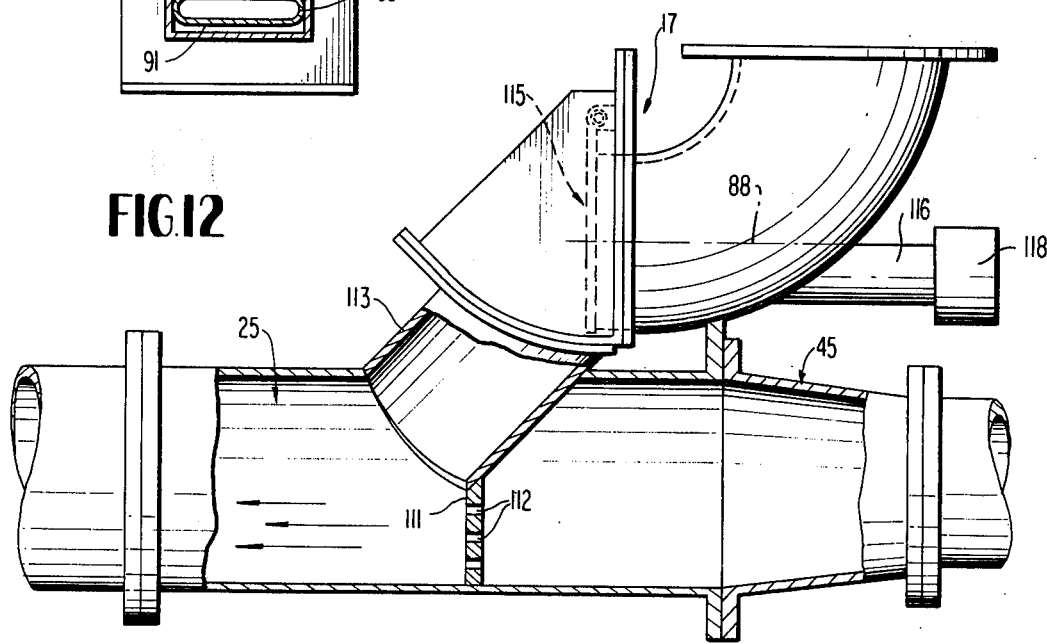
FIG. 12 is a side elevation in section of an alternate embodiment of a portion of the pneumatic conveying apparatus.

FIGS. 12-13 show yet another embodiment where the restricted area between the source of high pressure air 45 and transition chamber 25 is provided by a plate 111 fitted below a section of pipe 113 which is the lower part of the product feed chute. The plate 111 is provided with a plurality of orifices 112 whose axes are parallel with the axis of the pipeline 27. Orifices 112 direct a stream of air axially along the pipeline at and below the center line thereof. Door 115, which serves as the valve member, is mounted on a suitable hinge at the lower end of the upper chute section 17. Optionally, a pipe 116 may be provided at the lower end of the upper chute section and a hose, not shown, attached to modify this apparatus to handle a liquid product as well as a dry, granular or powdery product which can be introduced through the upper open inlet end of chute 17.

One of the advantages of employing a 90° elbow as the upper portion of chute 17 as illustrated in FIG. 12 is that with a dry product, the product follows a flow path as generally illustrated in FIGS. 2 and 5 (on sheet 2) and thus does not completely fill the cross-sectional area of the chute. Thus, the product is kept moving without compaction and flow can be rapidly cut off by closure of the door 115 which serves as the valve member. In the case where the product is a liquid and cap 118 is replaced by a hose, the liquid level cannot go above line 88 even when door 115 is closed as long as the liquid level is lower than pipe 116. The force due to the weight of the product acting on door 115 is thereby controlled to be sufficiently small so as not to prevent satisfactory operation of door 115.

Turning now to FIG. 14, an embodiment is illustrated which is adapted to be used when the product is removed from a storage tank which is pressurized for the purpose of facilitating product flow along channels 15 (see FIG. 1). In such a system, which conveniently utilizes an air slide feed, it is desirable to remove the small positive pressure applied from the storage tank at the chute 17 to reduce any effect of such positive pressure in the chute 17 on door 39 so that door 39 will possess the proper sensitivity.

A bypass line 147 is connected at junction 148 to the chute 17 and to the main pipeline 27 at 149. The position 149 is downstream from where the high velocity air stream is injected into the transition chamber so as to minimize any interference with the normal operation of valve member door 39. This bypass line 147 may be constructed of a pipe of somewhat smaller diameter than that of the main pipeline 27 since it does not transport any product.

The bypass line 147 acts to vent the small positive pressure in the direction of arrows 146 associated with a conventional air slide feed into the main pipeline 27 at junction 149. The pressure at junction 149 is normally at a slight negative pressure as a result of the air flow past a small protruding lip 161 at the end of pipeline 147.

Pipeline 147 is also provided with a check valve 152 positioned within an enlarged housing section 153. Valve 152 is normally open, but closes in the event of a pressure buildup in the main pipeline 27. This door operates in a fashion similar to that of the door 39, being freely hinged and hanging substantially in a vertical plane. As noted, the normal conveying pressure differential between point 149 and point 148 is sufficient to keep door 152 open; however, a pressure buildup within the pipeline 27 will quickly reverse the differential to slam the door 152 tightly shut and prevent any blowback.

A baffle plate 155 partially covering the inlet to the bypass line from the chute at 148 comprises a generally smooth, flat piece of material secured to chute 17 as at 157 and shaped to be spaced from the bypass inlet to prevent material flowing to the chute from entering the auxiliary pipeline 147. By restricting the flow of product to prevent filling the entire cross-section of chute 17, there is unrestricted passage of air through pipeline 147 in the direction of arrows 146.

The purpose of bypass line 147 is to reduce the positive air pressure which would otherwise be in chute 17 and act against door 39. A clogging or blockage in the main pipeline 27 will cause a pressure buildup at junction 149 and cause the valve 152 to shut slightly ahead of the closing of door 39. Use of the bypass line 147 thus reduces the air flow through chute 17 along the product to approximately the same level as is present in gravity feed systems which may not employ the air slide.

As previously discussed with relation to FIGS. 2-4, the check valve door 39 is precisely balanced and freely hinged to act instantly to pressure changes. This pressure sensitivity is an important aspect of the invention and is a major contributory factor in preventing overloading of the system and causing blowbacks without the need for a screw feed or air lock. The system is preferably accurately tuned to keep this door 39 at this high degree of sensitivity. When conveying material by gravity without additional air flow in the chute, the pressure differential between the transition chamber and the chute is such as to properly initiate the door closing even during slight pressure changes.

It can therefore be appreciated that the pressures which may normally develop within the chute 17 during air slide operations would adversely affect this desired tuning. The bypass line, then, serves to remove or at least reduce the effect of this positive pressure on the system and restore the capability of the door 39 to react to minute pressure differences. To this end, the bypass line diameter should be properly closed to bleed off just the right amount of air from the chute. To get optimum performance, it may be desirable that an adjustable valve 150 be included in the line 147, as illustrated.

It can be appreciated, however, that when a power operated door closing device such as has been previously disclosed with reference to FIGS. 10 and 11 is utilized with an air slide system, the bypass line may not be necessary, since the actuator provides an external force sufficient to overcome forces caused by the increase in chute pressure. The vertically hanging door is more sensitive to these air slide pressures which are preferably compensated for with the bypass line 147.

For the system shown in FIG. 14, wherein a main pipeline 27 of about six inches in diameter is employed, the bypass line 147 should have an inside diameter of at least two inches where it has a length of about five feet. The chute 17 may have an inside diameter of about four inches and be inclined at approximately 45° with the lower surface of chute 17 at the location of valve member 39 being substantially horizontal. The above-noted dimensions are by way of an example.

Referring now to FIG. 15, there is shown an alternate form of a portion of the pneumatic conveying apparatus wherein a chute 119 which feeds the product into the transition chamber 25 is a substantially horizontal length of pipe. Chute 119 receives material in a conventional manner, as from a funnel-shaped hopper 121 which has a plurality of orifices 125 at its lower portion that open into chamber 123 which may be connected to a pipe 124. The product flow along the horizontal chute section 119 is assisted by the introduction of air through orifices 125 at atmospheric pressure; or optionally, a slight positive pressure of one or two psi may be applied to pipe 124 to create an air slide. This air introduced through orifices 125 also tends to fluidize and reduce the tendency of the product to clump.

As noted, the increased pressure in the chute 119 due to the air introduced through pipe 124 is desirably vented to a point along the main pipeline 27 downstream of transition chamber 25 by a bypass line 147, as fully described in connection with FIG. 14. Also, as previously noted, the door 39 must be accurately balanced while taking into consideration the various pipe sizes and other parameters of the particular embodiment. The bypass line chosen in this case should be particularly suited for the air flow characteristics of the configuration shown. Therefore, in a sense, the entire system should be accurately tuned for the most economical and efficient operation.

Referring now to FIGS. 16 and 17, there is seen another embodiment in which the dimensions of the transition chamber are adjustable. As in the previously discussed embodiments, product 57 is delivered to the inlet end 170 of chute 205 from a source, such as a hopper (not shown), by gravity. The chute enters the apparatus through an opening in a high pressure chamber 173 which is supplied with high pressure gas, such as compressed air or steam, from any suitable source (not shown). Intermediate portion 171 of the chute, inside the pressure chamber 173, curves forward and terminates in a straight axial portion 172 which is circular in cross-section and is coaxial with pressure chamber 173. In front of pressure chamber 173 is a forwardly tapering transition chamber 176.

The transition chamber 176 is provided at its upstream end with a cylindrical portion 183, internally threaded to mate with external threads 199 on the downstream end of the pressure chamber 173. At the downstream of pressure chamber 173 is a support wall 177 having a flange-like portion 181 which is secured to the inside wall of the pressure chamber 173 by suitable means, as for example, by welds 179. Support wall 177 is provided with a cylindrical passageway 182 which is also coaxial with the straight axial portion 172 of chute 171, the high pressure chamber, and the transition chamber 176. The end 172 of chute 171 is secured to the rear of the end wall 177 in any suitable manner, for example, by weld 178. The chute portion 171 and the wall 177 together constitute a first chute section having a material passage therethrough the outlet end 182 of which has a certain cross sectional area.

The forwardly facing end of end wall 177 is provided with a threaded portion 200 onto which is screwed a conical pipe member 175 which is also coaxial with transition chamber 174 and which may be thought of as a second chute section for receiving material from the first chute section and feeding it to a high velocity air stream. Conically-shaped member 175 has substantially concentric inner and outer walls 207 and 208, respectively, that have the shape of a frustrum of a cone having its apex end in the direction of the pipeline downstream of the transition chamber, forming a conical passageway 192 which decreases in cross-section in a forward direction and terminates in a circle having the same diameter as the inner diameter of passageway 182 and of the end 172 of chute 171. Preferably, the length of conical passageway 192 is greater than the diameter of the pipeline. Thus, the cylindrical passageway 182 and conical nozzle 175 form an extension of chute 171. In effect, therefore, the forward end of nozzle 175 constitutes the outlet end of chute 171. Stated differently, the product chute 205 may be described as comprising an inlet end for receiving product from a source (not shown); an intermediate section having a first, curved portion and a second, straight portion coaxial with pressure chamber 173 and transition chamber 176; and an outlet end terminating in a pipe member 175 coaxial with the transition chamber and extending partially into the latter. The diameter of the outer wall of the conical member is at all times smaller than the diameter of the inside wall of the transition chamber 176, the two, together, defining a conically-shaped space 191 between them which serves as a nozzle to provide a sheath of high velocity gas flow that produces a pressure substantially less than atmospheric in the transition chamber 176 that creates, during normal operation, a suction force of substantial magnitude at the outlet end of the pipe member 175.

Referring to FIG. 17, it will be seen that the flange-like portion 181 of end wall 177 is provided with a plurality of holes 185 extending completely through the thickness of the flange. These holes form the passageways through which high pressure gas is injected into the transition chamber. The gases pass through the holes and through the annular passageway 191 into the mixing zone 193 in front of the end of nozzle 175. The number of holes 185 and their diameters are so selected that the sum of their areas is equal to or greater than the cross-sectional area of mixing zone 193. A gas under high pressure, such as compressed air or steam, is injected into the high pressure chamber 173, and then passes through holes 185 into annular space 191. There, because of the smaller area, the velocity of the gases is greatly accelerated, creating a zone of subatmospheric pressure in front of the end of nozzle 175 inside the transition chamber. Furthermore, because the zone 193 of the transition chamber in front of the nozzle continues to taper, the velocity of the gases continues to accelerate. Since chute 205 ordinarily is connected to a source which is at atmospheric pressure, product is drawn through nozzle 175 and is picked up by the stream of rapidly flowing, low pressure gases in the mixing zone 193 of transition chamber 174. The latter terminates in a pipe section 196 whose inner diameter is the same as the inner diameter of the end of pipe member 175 and of the cylindrical passageway 182. In this way, a stream of entrained product 57 and the flowing gases is formed which flows smoothly through the apparatus without turbulence.

The downstream end 196 of the transition chamber can be connected to a pipe (not shown), such as the pipe 27 shown in FIG. 1. In order to assist in entraining product 57 as it reaches the bottom of the curved intermediate portion 171 of chute 205, an opening with a length of pipe 189, having its axis parallel to that of the pressure chamber 173, is secured in any suitable manner to the bottom of the chute so that the bottom portion of the inner wall of the pipe 189 is tangent to the curved portion 171 and forms a smooth transition to the straight portion 172 of the chute, as can be seen in FIGS. 16 and 17. Pipe 189 is preferably supplied with high pressure gas from the same or a different source as the main body of high pressure gas in chamber 173 through a separate line similar to that shown in FIG. 7 and having a valve 83 for cutting off or regulating the gas flow through pipe 189 as desired.

To assist in entraining product 57 in the flowing gases, it has been found desirable to drill a number of small holes 190 through end wall 177, as shown in FIG. 17 to provide an auxiliary high velocity stream of gas in the direction of the pipeline to enhance the feed of product from the outlet chute section. Three holes have proved to be sufficient for the purpose. These holes 190 provide enough additional gases to assist in keeping moving product away from the lower wall surface 207 of member 192, particularly when the particles are heavy and tend to settle out by gravity. Their function of reducing the likelihood of turbulence and erosion of the inner wall surface due to the impact of rapidly moving solid particles is accomplished without interfering with the operation of valve door 39 since they are located on the portion of the chute which is downstream of the door 39.

As in the embodiments previously described, a valve in the form of a door or flap 39 is provided to prevent blowback into the chute in the event of downstream blockage or other increase in positive pressure. In the embodiment of FIGS. 16 and 17, valve 39 is placed between the intermediate portion of the chute and its outlet end by mounting it on the forward face 203 of end wall 177. As shown in FIG. 16, the flap is secured at its top as by means of a bolt 201. Flexibility is provided by making the main body of the flap of a rubber sheet 197 backed up by a steel plate 198 for stiffness.

As in the other embodiments, the low pressure on the right side of flap 39 as viewed in FIG. 16 causes it to open and transmit the section force which facilitates the flow of product through member 175 into mixing zone 193. However, in the event of any slight downstream blockage which would produce a buildup in pressure, the valve immediately swings shut and prevents blowback of the gases into chute 205.

An important feature of this embodiment is the fact that the size of the mixing zone 193 of transition chamber 176 and the thickness of the high velocity gas stream are both adjustable. As already mentioned, the transition chamber is mounted on the forward end of pressure chamber 173 by means of threaded cylindrical portion 183. A ring 184 is secured in any suitable manner to the cylindrical portion 183, such as by welding, to form a flange-like member. A suitable number of holes 186 are drilled around the periphery of the ring to permit gripping by means of a spanner wrench or any other suitable tool to rotate the entire chamber 176. Thus, by rotating the chamber clockwise or counterclockwise, the length of mixing zone 193 and the thickness of the conical sheath of high velocity gas may be appropriately adjusted after installation to accommodate any particular product and to "tune" the system for the most efficient flow of gases by taking into consideration the length of the pipeline, the capacity of the gas source and the properties of the product. Once the transition chamber 176 is moved to the right as viewed in FIG. 16 to its optimum position, it is secured in that position as by means of threaded ring 187 which can be tightened against the face of flange 184 to secure it in any given position. Holes 188 provide the means for applying a wrench or other tool to ring 187.

Coupling flange 194, instead of being rigidly secured to the end 196 of the mixing chamber, has a circular opening 195 slightly larger than the outside diameter of the cylindrical end of the mixing chamber to provide support by means of a sliding fit. A pipe such as pipe 27 in FIG. 1 (not shown in FIG. 16) can be connected to coupling 194 in any suitable manner known to those skilled in the art to slidably accommodate the end 196 of the transition chamber to provide a conduit for transporting product leaving the apparatus. This construction allows the system to be "fine tuned" while in actual operation after being installed in a pneumatic conveying system.

Referring now to FIGS. 18–22, a further embodiment is shown which is arranged to control the rate of feed of the product for maximum efficiency in terms of tons per hour that can be conveyed by the pneumatic conveying system. One of the problems has been that if the product feed rate exceeded that which could be handled by the pipeline, the valve in the product chute could not effectively meter the flow rate. Also, when the air compressor was shut down, special precautions were required to prevent product from filling the transition chamber and product chute which would prevent the valve door from closing. Accordingly, there may also be provided a pair of tanks arranged in parallel so that while one is being emptied into the pipeline, the other is being filled. Both tanks can be simultaneously closed to prevent feed into the pipeline even when the air pressure is turned off.

Figure 20:
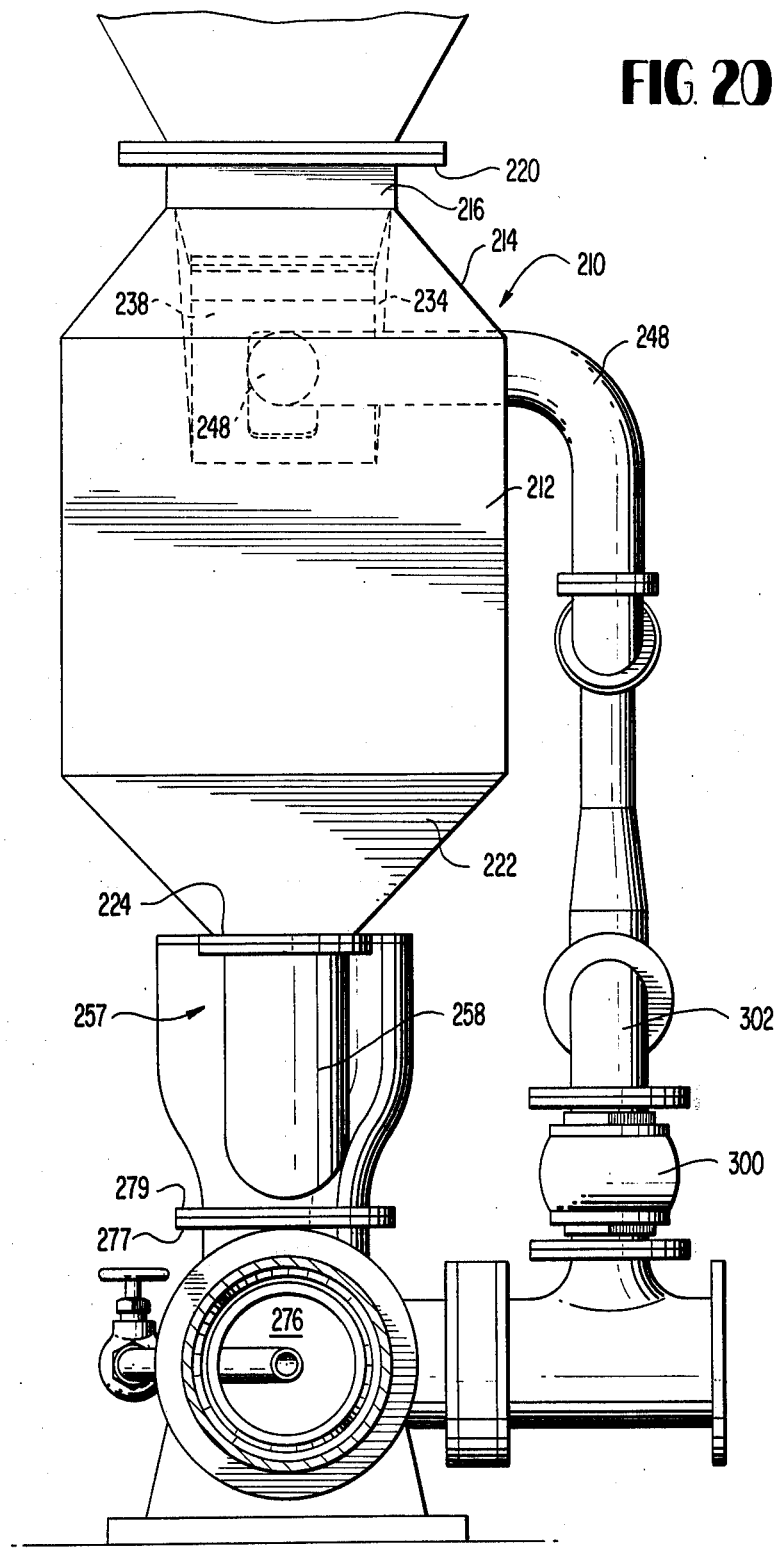
FIG. 20 is a right side elevation of the apparatus of FIG. 18.

With continued reference to FIGS. 18–20, a dual tank 210 has a central body portion which may be of substantially oval cross section having semi-cylindrical end portions 211 and 212 separated by plate 230. The upper end of the tank unit includes a truncated tapered portion 214 terminating in a cylindrical end portion 216 providing a product receiving opening 218 surrounded by a circular flange 220. The lower end of the tank is illustrated with a pair of inverted conical sections 222, 223 each terminating in separate openings with respective flanges 224, 225.

The dual tank 210 may be divided into two compartments 226 and 228 in any suitable manner. In the illustrated embodiment a vertical flat wall member 230 is shown which extends from the top opening 218 and has its lower end secured at the top of the inverted conical sections 222, 223.

At the upper end of the tank are two product receiving conduits 234 and 236 for entry of the product into the compartments 226 and 228, respectively. At the inner ends of each of conduits 234 and 236 are valve closure members or doors 238 of similar construction. The bottom of the lower wall of conduits 234, 236 extends to a position approximately under the vertical walls of cylinder 216 and is sloped to reduce the force of the product acting against the inside surface of door 238.

Referring further to the enlarged views in FIGS. 21 and 22, each door member 238 includes a flat rear support surface 240. This surface 240 is secured to a layer or sheet 252 of plastic or rubber which is hinged at its upper side to the open end 237 of receiving conduits 236 and normally hangs downwardly in a valve open vertical position as shown in tank 211 of FIG. 18 and is pivotable about a substantially horizontal axis to its closed position as shown in tank 212.

Referring again to FIGS. 21 and 22, the valve closure member 238 has a hood 242, which is bulged and may have a semi-cylindrical shape with opposite edges secured to the back of the flat surface 240 with closure plates 244 at each end to form a chamber. The hood 242 is provided with an elongated opening 246 for receiving the end of a pipe 248 (see also FIGS. 18 and 20) which extends from the exterior of the tank for a purpose that will be described subsequently. The width of the opening 246 is only slightly larger than the outer diameter of pipe 248 and the length of opening 246 is such as to permit the doors 238 to move freely between the closed position shown in FIG. 18 in the right hand product receiving compartment 226 and the open or free-hanging vertical position shown in the left hand product receiving compartment 228 with surface 240 against the end of pipe 248.

The hinge for the closure member 238 may be of any suitable type. I prefer to use a flat, flexible sheet 252 of a rubber or plastic material such as polytetrafluoroethylene that can be easily secured to the flat surface 240 of the door 238. The upper end of sheet 252 may be easily clamped between two metal strips and a low friction hinge is thereby provided which has a long life and requires no lubrication. The flexible property of the sheet member 252 permits the door 238 to move between the open position shown in chamber 228 and the closed position shown in chamber 226 as a result of a flow of air under pressure through corresponding pipe 248. Also the sheet members 252 function as a sealing gasket and produce very little noise as the valve closure members 238 are moved to their closed position.

The bottom of the dual tank 210 is provided with a suitably shaped closure member to close the two tank compartments 226, 228 except for an opening 256 for each tank communicating with a Y-shaped housing 257 which is flanged at its two upper ends for attachment to mating flanges surrounding openings 256 of the dual tank 210. Y-shaped housing 257 has two inlet product channels or chute sections 258, 259, one for each of the tank compartments 226 and 228. The conduits 258, 259 are identical and each have end openings 260 lying in a plane at an angle of between about 25° and 35° from a vertical plane or preferably about 30° as illustrated. Each opening 260 is provided with a check valve in the form of a flat closure element 262 having a face area greater than the cross sectional area of the internal passage in the outlet end portion of the corresponding chute sections 258, 259. The closure elements 262 may be constructed in a manner described in connection with closure elements 238 and include flexible sheet members 264 hingedly secured at 266 and rigid support plates 268 of steel secured to the flexible sheet members 264.

Springs 270 resiliently urge the closure elements 262 toward a closed position. Springs 270 may not be needed with low density material, and the amount of spring force required for optimum operation will depend on a number of factors including the angle of the end opening 260, the size and weight of the steel plates 268 as well as the density of the product and the pneumatic characteristics of the pipeline which influence the negative pressure in the transition section 284 at the end of the product chute 276.

A closed chamber is provided by walls 272 and surrounds the ends of the product conduits 258, 259. This chamber, during operation has less than atmospheric pressure because it is in communication with a discharge elbow 276 that extends into the pipeline at a region where high velocity gas or air exits as described above. The closed chamber provided by walls 272 and the elbow 276 constitute a lower or second chute section. The elbow extends through a high pressure chamber 278, also shown in FIG. 19. At the end of the feed chute elbow is an annular projection 280, cooperating with an inner annular projection 282 on the inner surface of the transition chamber 288 to form an annular sheath of high velocity air flow which creates a negative pressure that extends into the sealed chamber in which the check valve type closure members 262 are located as described above. The novel product feeding arrangement of the present invention is connected to the upper flanged end 277 of the elbow with a suitable flange 279 on the lower end of the Y-shaped housing 257.

The dual tank 210 includes access openings with removable sealing closures 286 for the compartments 226 and 228. In addition, each compartment may be provided with sealed inspection window, only one of which for the compartment 228 is shown at 288 in FIG. 18.

A conventional turbine type air compressor 290, shown in FIGS. 18 and 19, may be used to supply compressed air or other suitable gas through the conduit means including members 292 and 294 to pressure chamber 278. A smaller pipe 296, extending into the material output conduit may be used if desired to produce a high velocity stream in the central part of the lower elbow portion of the chute 276. Valve 297 is provided to regulate the flow through pipe 296.

As best seen in FIG. 19, the compressor 290 also supplies compressed air through a pressure reducing valve 300, conduit 302, tee coupling 303, and valves 304 to the pipes 248 which extend into the chambers 226 and 228. The valves 304, one each in the path of low pressure air flow between the conduit 302 and each of the pipes 248, are controlled so that only one of the pipes 248 is supplied with compressed air at one time. The valves 304 may conveniently be electrically operated by signals from a control box 306 to which they are connected through conductors 308 and 310.

The lower portions of the chambers 226 and 228 are shown with suitable product presence sensors, such as switches 312 of a type commercially available and responsive to the presence of product in the respective compartments 226, 228. These sensors may be of any known construction that will open or close a control circuit as the product level falls below a selected height. The sensors 312 are connected through conductors 314 and 316 to the control box 306.

Air relief valves 318 are sometimes provided in the upper portions of each of the compartments when needed. These valves 318 may be also electrically operated and connected through conductors 320 and 322 to the control box 306.

The operation of the apparatus as described in connection with FIGS. 18–22 is as follows. Before the air compressor 290 is turned on, the valve doors 264 in the Y-shaped housing 257 are both in a closed position, even when both tanks are filled with product. The doors 238 at the upper ends of both tanks are open and assuming, as is customary, a supply of product is present, both tanks 211 and 212 will be filled.

By using 90° elbows for product channels 258, 259 in the Y-shaped housing 257, the outlet opening 260 is displaced laterally of the opening 256 at the lower end of its tank. This helps reduce the force tending to open the lower check valve doors 262 due to the weight of the product.

Where the product has good flow properties such as the case with a phosphate fertilizer, it has been found desirable to hang the door 262 not in a vertical position as shown in some of the other embodiments, but at an angle so that the door closed position makes an angle of about 30° with the vertical as illustrated. The weight of the steel plate 268 portion of the door provides an additional closing force. An added closing force, as needed, may be provided by spring 270. One desirable, though not an essential feature for many products, is that both doors 262 should remain closed prior to start up to avoid filling the lower chute section 276 and transition chamber 284 with product.

By having valve 300 closed at start up, the compressor can be started and brought up to a stable operating condition which might, for example, mean a compressor pressure of 20 to 25 psig. Then opening valve 300 to provide a relatively lower pressure of perhaps 5 psig to tee 303 (FIG. 19) and valves 304 to one of the tanks 211, 212 to close its respective product inlet door 238, places this lower pressure on the upper surface of the product and thus provides an added force for opening the door 262 in the Y-shaped housing 257. The product continues to feed into the transition chamber 284 and the lower end of the open door 262 is at a position which may abut, or at least interfere with the opening of other door 262. when the product falls below product sensing switch 312, the circuit is changed so that the voltage from control unit 306 closes the open valve 304 and opens the closed valve 304. Valve 318, if used, provides a small vent opening to the atmosphere so that as product enters a tank 211, 212 the displaced air can escape without building up a pressure in the tank. This valve is not required if the product entering the dual tank 210 is not tightly packed and from a chamber open to atmospheric pressure.

When the signal from control unit 306 is received by the valves 304, the valve 304 that is opened supplies a blast of air against the abutting rear surface 240 of the open door (see tank 211 of FIG. 18) which is effective to force the door closed and cut off the incoming feed of product. The slot 246 in the semi-cylindrical wall 242 accommodates the end of pipe 248 as the door 238 closes. The gas inside the chamber enclosed by semi-cylindrical wall 242 leaks through slot 246, but at a rate insufficient to reduce the force on surface 240 enough to allow the door 238 to open.

The pressure of the air on the upper surface of the product quickly builds up to the level where product discharge through the lower door 262 starts. It has been surprising to observe that when the air flow through pipe 248 at the top of one of the tanks 211, 212 is turned off and product starts to enter the tank, the corresponding lower door 262 in the Y-shaped housing will close sufficiently soon that the other lower door 262 can open. By reason of the close proximity of the two doors 262, the open door moves up to a position which either maintains the other door completely, or very nearly, closed notwithstanding the negative pressure in the lower product chute region 276 and the weight of product acting against the closed door 262.

For "fine tuning" of the operation of this apparatus, valve 297 can be adjusted to regulate the flow rate of air through pipe 296 which also influences the negative pressure in chamber 276 and enhances the feed of product into the pipeline. Adjustment of the annular slot between surfaces 280 and 282 during operation of the apparatus as by use of the construction shown in FIG. 16 is advantageous.

In the event of a blockage in the pipeline, a positive pressure build-up occurs in the transition chamber 284 and feeds back to close the open door 262 and maintain both doors 262 closed until the pipeline flow rate is again established.

As the product drops below product level sensing switch 312, the product feed channel elbow 258, 259 is no longer completely filled and the gas under positive pressure in the tank 211, 212 passes into the negative pressure region of the transition chamber 284 thereby reducing somewhat the product feed rate and providing a time to allow the main pipeline to clear just before the switching action to the other tank happens.

Instead of using product sensing switches 312, I have found that equivalent performance can be achieved with less cost and reduced maintenance by employing a timer in the control unit 306. I have determined that the maximum rate of handling product is achieved by effecting a switching of tanks at the end of comparatively short intervals of time, such for example as less than about two minutes. Thus, it is desirable to construct each of the tanks 211, 212 to have a size no larger than that which can be emptied in less than about two minutes. In one preferred installation, I found that arranging the switching to occur after approximately 5 seconds, the rate of material in terms of tons per hour seemed to be optimized.

I have achieved 10 per cent greater rate of material flow as compared with a prior art product feed device employing a screw as a means for preventing blowback when both product feed devices were operated in the same pneumatic conveying system, i.e., the same compressor and same pipeline delivering the same product into the same silo. One major advantage of my apparatus, as compared to the prior art apparatus that had been in use in this installation for several years, is that the power required to drive the screw was not needed. In this particular system, the motor to drive the screw was rated at 150 H.P. In this same system, the air compressor motor was rated at 200 H.P. Therefore, the power saving alone was on the order of 40%, the rate of feed was increased by about 10%, and in my new system the problems of maintenance are limited to those associated with the four check valves and the control system, whereas the screw machine in the prior apparatus requires considerable servicing, particularly where abrasive materials such as cement or ground phosphate rock are handled.

The present invention may be embodied in other specific forms without departing from the spirit or essential characteristics thereof. The presently disclosed embodiments are, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

What I claim is:

1. wherein Material handling apparatus comprising:
   means for providing a supply of material to be handled;
   a pipeline for conveying the material to a distant location;
   a source of gas under pressure connected to said pipeline for flowing gas therethrough along a path including a portion in which the gas has a high velocity to entrain said material; and
   means for feeding said material from said first mentioned means into the high velocity gas stream in said pipeline while preventing blowback of gas from said pipeline, said means for feeding comprising: passage
   a material chute section terminating in a discharge end at which there is a material flow passage therethrough having a first cross sectional area, said discharge end having an end wall extending around the periphery of the material flow passge therethrough at a location out of the high velocity gas stream,
   flexible conduit means communicating at the discharge end thereof with the interior of said material chute section and having an inlet end for receiving the material to be handled, the inlet end of said flexible conduit means being disposed at a level below said material chute section, the lowermost portion of the interior wall of said chute section being at the discharge end thereof, and said flexible conduit means communicating with the interior of said material chute section at a level above the level of said lowermost portion of the interior wall of said chute section,
   a valve member having a face area greater than said first cross sectional area and being mounted adjacent said discharge end of said chute section for swinging movement on the downstream side of said chute section end wall about an axis, said valve member having a face for sealing against said end wall of the discharge end of said chute section in one position and being movable about said axis away from said end wall, and
   means for providing on opposite sides of said valve member a first gas pressure differential when it is desired to feed material through said chute section and a second gas pressure differential at times of pipeline blockage events, said first and second gas pressure differentials being in opposite directions and being sufficient both to hold said valve member away from said chute section end wall when it is desired to feed material through said chute section and to seal said valve member against said chute section end wall under pipeline blockage conditions to prevent blowback, said high velocity gas flow being provided by a restriction of the cross sectional area of the gas stream and being accompanied by a reduction in pressure to a level below atmospheric, said below atmospheric pressure being communicated back through the material passage to draw material through said flexible conduit means.

2. Apparatus according to claim 1 additionally comprising check valve means in said flexible conduit means to permit flow of liquid material from the inlet end of the flexible conduit means and prevent backflow of liquid material toward said inlet end of the flexible conduit means.

3. Apparatus for controlling the feed of a product into a pneumatic pipeline from a supply of product comprising:
   a source of gas under pressure substantially higher than atmospheric;
   a transition chamber having one end connected to said gas source and the other end connected to the pipeline;
   means associated with said transition chamber through which gas from said source flows toward said pipeline forming an opening means having a cross sectional area sufficiently smaller than the cross sectional area of said pipeline to cause gas flow at a sufficiently high velocity in the direction of the pipeline to produce during normal operation a region in the transition chamber having a pressure substantially less than atmospheric;
   means for feeding the product into the high velocity gas stream in a manner to minimize turbulence for transport of the product to a distant storage receptacle including an enclosed product feed chute means extending from the supply of product into the region of said transition chamber having less than atmospheric pressure to discharge product along the direction of the pipeline without employing a power driven product conveying member, said product feed chute means comprising an upper chute section having inlet and outlet ends and a lower chute section having inlet and outlet ends with the outlet end of the upper chute section being disposed to deliver product to the inlet end of the lower chute section, said feeding means including:
   a valve member mounted for pivotal movement at the outlet end of the upper chute section arranged to seal off said upper chute section against blowback, said valve member having a surface area exposed to the pressure in said transition chamber, said surface area being sufficient to provide an operating force that is effective to cause said valve member to be opened by the less than atmospheric pressure in the transition chamber to allow product feed and closed during operation by a positive pressure in the transition chamber to prevent product feed and blowback through said chute means in the event of pipeline blockage, and there being an opening in said lower chute section communicating with said gas pressure source to provide an auxiliary high velocity gas stream aimed in the direction of the pipeline axis to enhance the feed of product from the lower chute section into the pipeline, said last mentioned opening being located downstream of said valve member whereby the force due to the air stream through said opening does not impinge on the side of the valve member which engages the product in the chute means, said transition chamber being provided with an interior wall having a substantially annular surface, the outlet end portion of the lower product feed chute section having a substantially circular outer surface that is substantially coaxial with said transition chamber interior wall, with the space between said annular surface and said circular outer surface forming the opening means associated with said transition section to produce said high velocity gas flow, and the opening providing said auxiliary gas stream located in the lower chute section being connected to said high pressure gas source through a conduit including a regulating valve for adjusting the rate of flow of gas through said opening.

4. Apparatus for moving in a gas stream large quantities of material at low power consumption rates and without the need for screw conveyor or rotary vane devices in connection with the introduction of the material into the gas stream, said apparatus comprising means for providing a supply of material to be handled;

a pipeline for conveying the material to a distant location;

a source of gas under pressure connected to said pipeline for flowing gas therethrough along a path including a portion in which the gas has a high velocity to entrain said material; and means for feeding said material from said first mentioned means into the high velocity gas stream in said pipeline while preventing blowback of gas from said pipeline, said means for feeding comprising:

a material chute section terminating in a discharge end at which there is a material flow passage therethrough having a first cross sectional area, said discharge end having an end wall extending around the periphery of the material flow passage therethrough at a location out of the high velocity gas stream, a valve member having a face area greater than said first cross sectional area and being mounted adjacent said discharge end of said chute section for swinging movement on the downstream side of said chute section end wall about an axis, said valve member having a face for sealing against said end wall of the discharge end of said chute section in one position and being movable about said axis away from said end wall, a second chute section having an inlet portion the interior of which receives said valve member and communicates with said outlet end portion of the other chute section to receive the material flowing therefrom when said valve member is disposed away from said end wall and having an outlet portion opening into said high velocity gas stream in the direction of flow of said gas stream, and means for providing on opposite sides of said valve member a first gas pressure differential when it is desired to feed material through said chute section and a second gas pressure differential at times of pipeline blockage events, said first and second gas pressure differentials being in opposite directions and being sufficient both to hold said valve member away from said chute section end wall when it is desired to feed material through said chute section and to seal said valve member against said chute section end wall under pipeline blockage conditions to prevent blowback.

5. Apparatus according to claim 4 additionally comprising means for providing a pathway along which gas from said source of gas under pressure may be caused selectively to flow through said outlet portion of said second chute section in the direction of intended material movement therethrough.

6. Apparatus according to claim 5 additionally comprising valve means associated with said pathway.

7. Apparatus according to claim 4 additionally comprising flexible conduit means communicating at the discharge end thereof with the interior of said first mentioned material chute section and having an inlet end for receiving the material to be handled, and wherein said high velocity gas flow is provided by a restriction of the cross sectional area of the gas stream and is accompanied by a reduction in pressure to a level below atmospheric, and wherein said below atmospheric pressure is communicated back through the material passage to draw material through said flexible conduit means.

8. Apparatus for controlling the feed of a product into a pneumatic pipeline extending from a supply of product to a distant storage receptacle while preventing blowback solely by means of a valve member where an enclosed product feed chute is connected to a pipeline through a hollow pipe member extending partially into a transition chamber;

said transition chamber having an outlet end connected to said pipeline through a coupling providing relative rotation between the pipeline and the transition chamber and an inlet end threadedly secured to a high pressure housing member through which high pressure gas enters said transition chamber, said transition chamber further having an inner wall surface portion that has the shape of a frustrum of a cone, said hollow pipe member having an end portion positioned to be substantially coaxial with the transition chamber and having an outer wall surface portion that has the shape of a frustrum of a cone to form together with the inner transition chamber wall surface portion a conically shaped passageway having its apex end in the direction of the pipeline downstream of the transition chamber, the outer wall of said hollow pipe and the inside wall of the transition chamber defining between them an annular space having a cross sectional area that is adjustable by rotation of said transition chamber and sufficiently smaller than the cross sectional area of said pipeline to form a gas stream flowing at a sufficiently high velocity in the direction of the pipeline to produce during normal operation a region in the transition chamber in front of said first hollow pipe having a pressure substantially less than atmospheric;

means for feeding product into the high velocity gas stream in such manner as to minimize turbulence for efficient transport to said distant storage receptacle including said enclosed product feed chute extending from the supply of product to where said feed chute joins said hollow pipe member to discharge product through said hollow pipe member along the axis of said annular space into the region of said transition chamber having less than atmospheric pressure, said feeding means also including said valve member, said valve member being mounted for pivotal movement upstream of said pipe member and having a surface area exposed to the pressure in the transition chamber, said surface area being sufficient to provide an operating force that is effective to cause said valve member to be opened by the less than atmospheric pressure in the transition chamber to allow product feed and closed by a positive pressure in the transition chamber to prevent product feed and blowback through said chute in the event of pipeline blockage, and support means secured at its outer edge to said high pressure housing member and having a central passageway sealingly secured to said pipe member for maintaining said pipe member coaxial with the transition chamber; said support means having a plurality of peripheral openings extending between high pressure gas source and the adjustable annular passageway defined by the space between the hollow pipe outer wall surface portion and the transition chamber inner wall portion, and wherein the inlet end of said transition chamber has internal threads which mate with external threads on the outer surface of said high pressure housing member so that adjustment of the negative pressure in the transition chamber may be achieved by revolving the outer surface of the transition chamber to thereby vary the width of said annular passageway while the apparatus is in operation.

9. Apparatus as claimed in claim 8 also including a gas passageway extending though the support means and axially parallel to the axis of said transition chamber, said passageway connecting the high pressure chamber with the interior of said pipe member downstream of said valve member and being disposed to produce a high velocity gas stream along the lower inner surface of said first hollow pipe member.

10. Apparatus as claimed in claim 8 wherein the product feed chute terminates at its lower end and is sealing secured to said support means; and said valve member is secured at its upper end to said support means with its lower end movable into said pipe member.

11. Apparatus for transferring large quantities of material in a gas stream at low power consumption rates and without the need for screw conveyor or rotary vane devices for introducing the material into the gas stream, comprising:

means for providing a supply of material to be handled;

a pipeline for conveying the material to a distant location;

a source of gas under pressure operatively connected to said pipeline for flowing gas along a path extending through said pipeline to entrain said material;

means for providing a reduced cross sectional area for said gas flow path and thereby increasing the velocity of said gas at a portion of said path; and means for feeding said material from said supply of material into said gas flow path while preventing blowback of gas from said pipeline to said supply of material, said means for feeding being provided with a material flow passage and comprising:

means for discharging the material into the high velocity gas stream in the vicinity of said reduced cross sectional area portion of said gas flow path, a chute section forming a portion of said material flow passage upstream of said discharging means and terminating in an outlet end portion at which the material flow passage therethrough has a first cross sectional area, said outlet end portion having an end wall extending around the periphery of the material flow passage therethrough, a valve member mounted adjacent said outlet end of said chute section for swinging movement about an axis, said valve member having an upstream face of an area greater than said first cross sectional area for closing against said end wall of the outlet end portion of said chute section in one position and being movable about said axis in a downstream direction away from said end wall, and means for providing on opposite sides of said valve member a first gas pressure differential when it is desired to feed material through said chute section and a second gas pressure differential at times of pipeline blockage events, said first and second gas pressure differentials being in opposite directions and being sufficient both to hold said valve member away from said chute section end wall when it is desired to feed material through said chute section and to close said valve member against said chute section end wall under pipeline blockage conditions to prevent blowback.

12. Apparatus according to claim 11 additionally comprising means for providing a pathway along which gas from said source of gas under pressure may be caused selectively to flow through the interior of at least an outlet portion of said means for discharging the material into the high velocity gas stream in the direction of intended material movement therethrough.

13. Apparatus according to claim 11 wherein said means for discharging the material into the high velocity gas stream has a substantially straight material flow passage therethrough.

14. Apparatus according to claim 11 wherein said means for discharging the material into the high velocity gas stream has a curved material flow passage therethrough.

* * * * *